(12) United States Patent
Tisserat et al.

(10) Patent No.: US 8,524,855 B1
(45) Date of Patent: Sep. 3, 2013

(54) PRODUCTION OF STABLE POLYESTERS BY MICROWAVE HEATING OF CARBOXYLIC ACID:POLYOL BLENDS

(75) Inventors: Brent Tisserat, Washington, IL (US); Ronald A. Holser, Athens, GA (US); Rogers E. Harry-O'Kuru, Peoria, IL (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 0 days.

(21) Appl. No.: 13/472,715

(22) Filed: May 16, 2012

Related U.S. Application Data

(60) Provisional application No. 61/546,111, filed on Oct. 12, 2011.

(51) Int. Cl.
*C08G 63/02* (2006.01)
*C08G 64/00* (2006.01)

(52) U.S. Cl.
USPC ........... 528/272; 528/176; 528/190; 528/192; 528/193; 528/194; 528/271

(58) Field of Classification Search
USPC ............... 528/176, 190, 192, 193, 194, 271, 528/272
See application file for complete search history.

(56) References Cited

U.S. PATENT DOCUMENTS

| | | | |
|---|---|---|---|
| 6,515,040 B1 * | 2/2003 | Scola et al. | 522/167 |
| 2005/0223587 A1 * | 10/2005 | Boily et al. | 34/268 |
| 2008/0200591 A1 | 8/2008 | Noda et al. | |

OTHER PUBLICATIONS

Pramanick, D., et al, "Synthesis and biodegradables of copolyesters from citric acid and glycerol", Polymer Bulletin, 19, 1988, pp. 365-370.
Holser, Ronald Alan, "Thermal Analysis of Glycerol Citrate/Starch Blends", Journal of Applied Polymer Science, vol. 110, 2008, pp. 1498-1501.
Durham, Sharon, "New Citric Acid-Based Polymers for Agricultural Applications", Aug. 24, 2005, News & Events, http://www.ars.usda.gov/is/pr/2005/050824.htm.
Budhavaram, Naresh, et al, "Simple esters of crude glycerol and citric acid", American Society of Agricultural and Biological Engineers, Paper No. 083836, Written for presentation at the 2008 ASABE Annual International Meeting, Providence, Rhode Island, Jun. 29-Jul. 2, 2008.
Paschauri, Naresh, et al, "Value-added Utilization of Crude Glycerol from Biodiesel Production: A Survey of Current Research Activities", Paper No. 066223written for presentation at the 2006 ASABE International Meeting, Portland, Oregon Jul. 9-12, 2006.

* cited by examiner

*Primary Examiner* — Terressa Boykin
(74) *Attorney, Agent, or Firm* — John Fado; Randall E. Deck; Lesley Shaw

(57) ABSTRACT

Environmentally-friendly, biodegradable polyol:carboxylic acid polyester solid-phase products may be produced utilizing microwave heating. In this process, a di- or tricarboxylic acid is reacted with a polyol such as a glycerol or a sugar alcohol, or an ester thereof with the application of heating by microwave energy. Sufficient microwave heating is provided to esterify the polyol with the carboxylic acids, while removing as steam the water by-product which is generated during the reaction. The polyesters so-produced are resistant to high temperatures and solvents, and may by cured and/or molded.

23 Claims, 9 Drawing Sheets

PRODUCTION OF STABLE POLYESTERS BY MICROWAVE HEATING OF CARBOXYLIC ACID:POLYOL BLENDS

CROSS-REFERENCE TO RELATED APPLICATIONS

This application claims the benefit under 35 U.S.C. 1.19(e) of U.S. provisional 61/546,111 filed Oct. 12, 2011, the contents of which are incorporated by reference herein.

BACKGROUND OF THE INVENTION

1. Field of the Invention

The invention relates to novel polyesters and a method of their production by microwave heating.

2. Description of the Prior Art

Numerous issues such as price uncertainty, manufacturing costs, environmental disposal, and geo-political issues affect the petroleum-based polymer industry. As an alternative, there is increasing interest in the development of biodegradable non-petroleum-based polymers which has risen steadily since the 1980s (Pramanick and Ray. Polym Bull 1988, 9:365; Pachauri and He. ASABE Mtg 2006, #066223, 1; Holser. J Appl Polm Sci 2008, 110:1498; and Budhavaram and Barone. ASABE Mtg 2008, #083836, 1). However, the price of the traditionally-used non-petroleum based polymers (e.g., poly(lactic acid), PLA) is high and not competitive with petroleum-based polymers (e.g., polyethylene terephthalate, PET) (Budhavaram and Barone, ibid). Therefore, the development of lower cost non-petroleum-based polymers is needed. Copolyesters can be prepared using polyfunctional acids and alcohols such as citric acid and glycerol, respectively (Pramanick and Ray. ibid; Pachauri and He. ibid; Holser. ibid; and Budhavaram and Barone. ibid).

Citric acid is relatively inexpensive and is the most commonly produced organic chemical obtained by fermentation (Soccol et al. Food Technol Biotechnol 2006, 44:141; and Budhavaram and Barone, ibid). Citric acid is a weak organic acid that naturally occurs in a variety of vegetables and fruits (Soccol et al. ibid). In 2007, approximately 1,700,000 million tons of citric acid was produced with as much as 50% produced in the People's Republic of China. About 50% of the citric acid is used in beverages, 20% in food applications, 20% in detergent applications and 10% in non-food related applications such as cosmetics, pharmaceutical and chemical industrial products (Soccol et al. ibid).

The production of biodiesel has resulted in an enormous excess of glycerol (Budhavaram and Barone. ibid; Yazdani and Gonzalez. Curr Opin Biotechnol 2007, 18:213; Lines. Published online: 3 Mar. 2009, DOI: http://snrecmitigation.wordpress.com/2009/04/19/an-exploding-market-utilizing-waste-glycerol-from-the-biodiesel-production-process; and Moon et al. Appl. Biochem. Biotechnol 2010, 161:1). Biodiesel is commonly produced from the transesterification of vegetable oil or animal fat feedstocks with glycerol generated as a co-product. For every ton (i.e., 1,000 Kg) of biodiesel manufactured, 100 Kg of glycerol is produced (Budhavaram and Barone. ibid; Yazdani and Gonzalez. ibid; Lines. ibid; and Moon et al. ibid). The 2000 market price for glycerol has plummeted to only $\frac{1}{10}^{th}$ of that price by 2009 (Pramanick and Ray. ibid; Lines. ibid; and Moon et al. ibid). We can presume in the future that the price of glycerol will continue to remain low and perhaps even continue to decline as biodiesel production escalates (Pramanick and Ray. ibid; and Lines. ibid). Industrial producers of glycerol are actively seeking new uses for this excess glycerol in order to increase the value for this product (Pramanick and Ray. ibid; and Ebert. J Biodies Mag 2007, 4:1). Several investigators have sought to employ glycerol as a feedstock for microorganisms in order to produce high-value chemical products such as succinic acid, propionic acid, ethanol, butanol and hydrogen terephthaleate (Moon et al. ibid).

Normally, citric acid and glycerol are considered plasticizers and are employed to increase the fluidity of the material to which they are added (e.g., plastics, concrete, wallboard, and clay). Glycerol may be combined with tricarboxylic acids such as citric acid to form a corresponding ester (Pramanick and Ray. ibid; Pachauri and He. ibid; Holser. ibid; and Budhavaram and Barone. ibid). Copolymers of glycerol and citric acid are relatively benign and biodegradable (Holser. ibid; and Budhavaram and Barone. ibid). The importance of heating to achieve glycerol citric acid copolyester polymerization has been previously demonstrated (Pramanick and Ray. ibid; and Budhavaram and Barone. ibid). Budhavaram and Barone (ibid) prepared copolyesters by blending various molar ratios of glycerol and citric acid to obtain a 15 ml solution in a beaker coupled with 9 ml of distilled water then stirring for 10 minutes while heating at 25-140° C. to drive off the water of reaction. Subsequently, the reaction continued for 2 to 3 days in order to achieve polymerization at 75° C. employing 1.2:1 molar ratio of citric acid:glycerol blend and even lower polymerization levels were achieved by heating at 45° C. even after 6 days (Budhavaram and Barone. ibid). Pramanick and Ray (ibid) mixed glycerol and citric acid in various molar ratios with p-toluene sulfonic acid within a flask and then incubated at 170° C. under nitrogen for 12 hr. After the elimination of the water by-product, the blend (i.e., glycerol citrate copolyester) was further heated for an additional 4 hours under the same temperature and conditions. A solid amorphous copolyester was collected from the reaction vessel which was purified by leaching several times with boiling ethanol (Pramanick and Ray. ibid). This amorphous solid copolyester was insoluble in water and other common organic solvents suggesting this polymer was "sufficiently cross linked" (Pramanick and Ray. ibid).

SUMMARY OF THE INVENTION

We have now discovered novel polyol:carboxylic acid polyester products and a process for their production utilizing microwave heating. In this process, a di- or tricarboxylic acid is reacted with a polyol or an ester thereof with the application of heating by microwave energy. Sufficient microwave heating is provided to esterify the polyol with the carboxylic acids, while removing water by-product as steam. The reaction produces a novel polyol:carboxylic acid polyester which is a solid phase material, preferably a foam. The foams so-produced are resistant to high temperatures and solvents, and may by cured and/or molded.

In accordance with this discovery, it is an object of this invention to provide an environmentally-friendly, biodegradable polyester polymer as an alternative to petroleum-based foams.

Another object of this invention to provide an environmentally-friendly polyester polymer produced from polyols such as sugar alcohols, glycerol or vegetable oils.

A further object of this invention to provide an environmentally-friendly polyester polymer produced from glycerol which is a by-product of the production of bio-diesel fuel.

It is also an object of this invention to provide polyester polymers which may be produced quickly and inexpensively, without the use of additional catalysts or solvents.

Yet another object of this invention to provide polyester polymers whose physical and chemical properties can be readily varied.

Other objects and advantages of this invention will become readily apparent from the ensuing description.

DETAILED DESCRIPTION OF THE INVENTION

Figure 1:
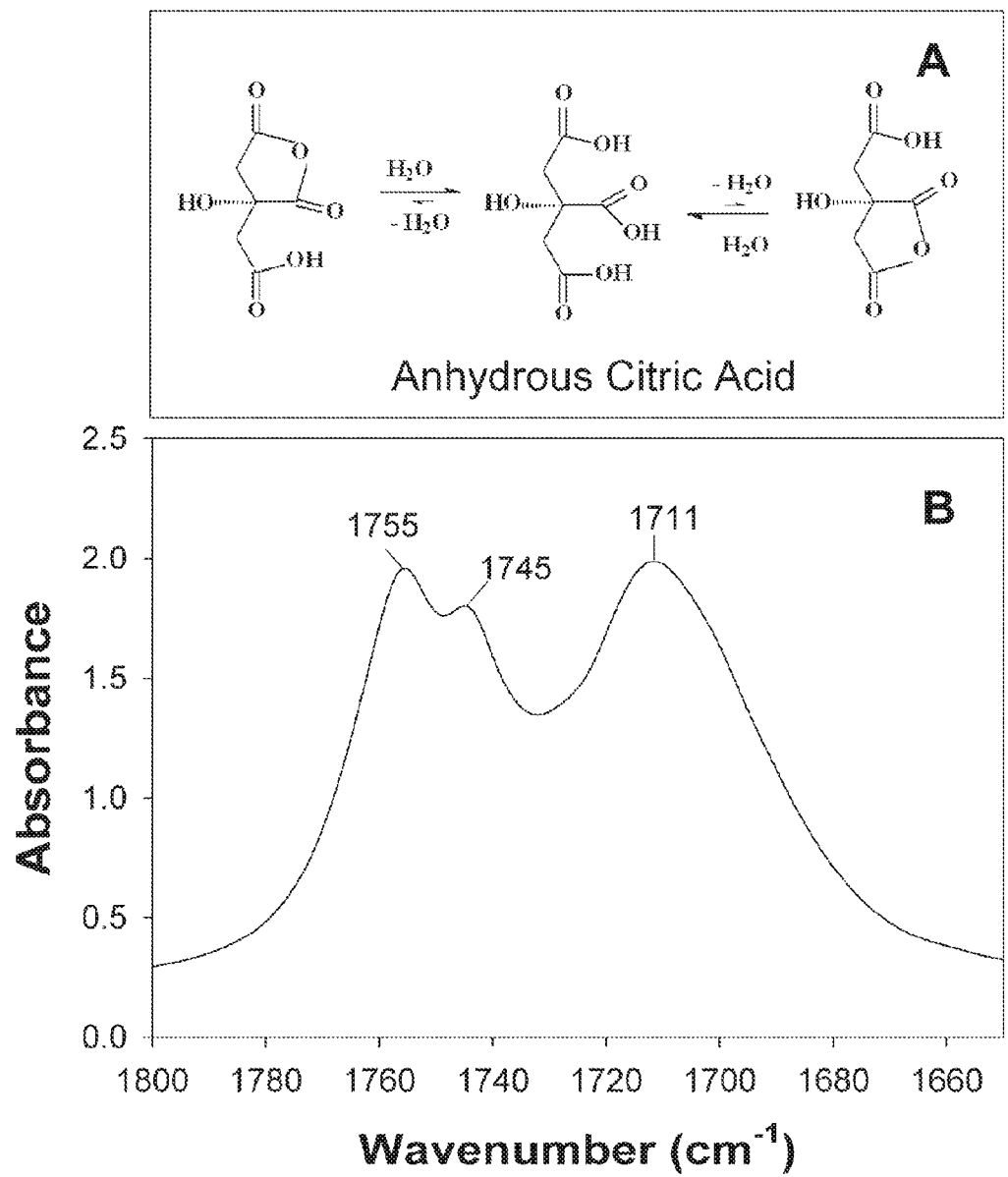
FIG. 1(A) shows the conformational forms of anhydrous citric acid reagents as per FT-IR, and (B) shows the 1900-1600 cm$^{-1}$ spectral region of anhydrous citric acid from commercial sources.

Using the process of this invention, cross-linked polyol: carboxylic acid polyesters may be formed as solid-phase polymers and foams which exhibit unique properties. In contrast with previously described reactions using other heating techniques, we have unexpectedly discovered that when the reactants, di- or tricarboxylic acids and polyols or their esters, are reacted with the application of microwave heating, the reaction can be driven forward to completion and yield a stable, solid-phase polymer, preferably a foam. The term foam is defined herein as a solid-phase matrix of the polyester comprising interdispersed irregular open or closed cells which are formed by the vaporization of water during the reaction and microwave heating. Moreover, the reaction may be conducted without the use of added catalysts or solvents, and without the application of additional steps and/or reagents to remove the by-product water formed during the reaction, as are utilized in the prior art.

The application of microwave heating in the process of this invention is critical, and allows the reaction to proceed to total or near completion. If the same reactants are reacted with application of heat by more traditional techniques, such as by conductive or convective heating with a gas burner, hot plate, autoclave or convection oven, the polyester products are typically in the form of liquids, gels or plastics. Without wishing to be bound by theory, it is believed that the application of microwave heating is essential, as the by-product water, which is formed in the condensation reaction of the ester formation, is rapidly removed as steam, thereby creating the solid-phase foam. This microwave heating allows the water to be removed more rapidly than other heating methods and prevents the water from driving the reverse reaction in accordance with Le Châtelier's principle. Further, the water is readily removed without the necessity of additional steps and/or reagents for its removal during the reaction (e.g., the azeotropic distillation with benzene of Pramanick and Ray, ibid). The microwave energy is also believed to mix the reactants, resulting in a relatively uniform polymer product.

Using the process of this invention, polyol:carboxylic acid polyesters may be formed as solid-phase polymers, including foams from a variety of di- or tricarboxylic acids and polyols such as glycerol or esters thereof. Suitable di- or tricarboxylic acids include any straight or branched chain, cyclic or aromatic hydrocarbon having two to three carboxylic acid moieties. Without being limited thereto, preferred di- or tricarboxylic acid include citric acid, oxalic acid, glutaric acid, malonic acid, adipic acid, succinic acid, pimelic acid, suberic acid (octanedioic acid), azelaic acid (nonanedioic acid), sebacic acid (decanedioic acid), phthalic acid (o-benzene dicarboxylic acid), isophthalic acid (m-benzene dicarboxylic acid), terephthalic acid (p-benzene dicarboxylic acid), as well as combinations thereof, with citric acid being particularly preferred.

A variety of polyols or their esters may be used in the formation of the polyester. Without being limited thereto, suitable polyols include glycerols (having three hydroxyl groups) and sugar alcohols, although glycerol is preferred because of its low cost. Glycerol for use herein may be obtained from a variety of commercial sources, and for reactions requiring a high degree of purity, the glycerol may be readily obtained in pure or substantially pure form. However, in a preferred embodiment the glycerol is obtained as the co-product from the preparation of biodiesel fuel from vegetable, algal, microbial or animal oils. Alternatively, the glycerol may be completely or partially esterified (i.e., a mono-, di- or triglyceride) with any C1 to C24 straight or branched chain hydrocarbon, which may be saturated or unsaturated, but is preferably epoxidized (epoxidized hydrocarbons or fatty acids will contain one or more oxirane rings which may also be referred to as epoxidized methylene groups). Although glycerides such as vegetable or other oils may be used, the reaction product will not form a stable, solid-phase polymer (e.g. foam) unless the oil is first epoxidized. The epoxides may be produced from a variety of unsaturated oils of plant, algal, animal or microbial origin as described below, or they may be obtained from commercial sources. Without being limited thereto, unsaturated vegetable oils which may be used include soybean oil, corn oil, pennycress oil, sunflower seed oil, high-oleic sunflower seed oil, canola oil, safflower oil, cuphea oil, jojoba oil, coconut oil, palm kernel oil, cottonseed oil, olive oil, peanut oil, castor oil, linseed oil, tung oil, rice oil, crambe oil, rape oil, and the like. These oils may have fatty acid moieties ranging in length from C2-C24, typically from C4-C4, and particularly from C6-C23, and having varying degrees of saturation from completely saturated to tri-unsaturated. Alternatively, animal fats, algal oils and marine oils, including fish and krill oils, may also be used, as well as synthetic triglycerides, such as triolein. A variety of other polyols are also suitable for use herein, particularly sugar alcohols, also referred to as alditols. Sugar alcohols have the general formula $CH_2OH(CHOH)_nCH_2OH$ wherein n is 2 or greater, preferably from 2 to 5. Examples of sugar alcohols include, but are not limited to, sorbitol (glucitol), mannitol, inositol, dulcitol, fucitol, iditol, xylitol, arabitol, ribitol, erythritol and threitol.

A variety of techniques for the epoxidation of unsaturated oils are known in the art and are suitable for use herein. In brief, the glycerides composed of the unsaturated fatty acids are reacted under conditions and for a period of time effective to at least partially, but preferably completely, epoxidize the carbon/carbon double bonds therein. These epoxidized triglycerides will contain one or more oxirane rings (which may also be referred to as epoxidized methylene groups). For example, without being limited thereto, suitable techniques include those described by Qureshi et al. (Polymer Science and Technology, Vol. 17, Plenum Press, p. 250), Croco et al. (U.S. Pat. No. 5,166,372), Nowak et al. (U.S. Pat. No. 6,740,763 or 6,734,315), and preferably Bunker and Wool (Synthesis and characterization of monomers and polymers for adhesives from methyl oleate. *J. Polym. Sci., Part A: Polym. Chem.* 2002, 40, 451-458), the contents of each of which are incorporated by reference herein. In accordance with one preferred embodiment, epoxidation is effected by reaction of the unsaturated triglyceride with a combination of a peroxide and a carboxylic acid or its anhydride, or by reaction with a peroxycarboxylic acid such as peroxy-benzoic acid. Suitable peroxides include hydrogen peroxide or any organic peroxides which will form a peracid with a carboxylic acid or its anhydride. However, preferred epoxidation reagents include hydrogen peroxide with either formic acid, benzoic acid, acetic acid, or acetic anhydride. The order of addition is not critical, and the peroxide and carboxylic acid may be combined prior reacting with the triglyceride, or they may be added separately to the triglyceride, or all of the peroxide, carboxylic acid, and triglyceride may be combined concurrently. The reaction is preferably conducted at low temperatures, more preferably between about 0 and about 30° C., most preferably between about 0 and about 25° C. Because the reaction is exothermic, the temperature is preferably controlled such as by cooling. In a particularly preferred embodiment, the reaction is initiated at a temperature of approximately 0° C. and maintained at this temperature for about 1 hour, before the temperature is allowed to increase to room temperature. The reaction is typically completed in approximately 3 to 6 hours.

In accordance with the reaction of this invention, the di- or tricarboxylic acid is mixed with the polyol or ester thereof while applying heating by microwave energy which is effective to esterify the polyol with the carboxylic acid and produce a polyol:carboxylic acid polyester, and to remove as steam the water by-product generated during the reaction. The reaction may be conducted in a variety of vessels or containers, and the polymeric foam will conform to the shape of the vessel employed as the reaction proceeds provided that adequate amounts of reactants are employed. Thus, the vessel should have sides sufficient to retain the polymeric foam therein. No additional catalysts, solvents or plasticizers are necessary, and the reaction may be conducted in their absence. However, catalysts may speed the reaction. Without being limited thereto, catalysts which may be used include, for example, p-toluene sulfonic acid, titanium butoxide and ethanol. The microwave heating is continued for a sufficient time to produce a solid-phase polymeric foam structure, preferably until the reaction is complete or nearly complete. A cessation in the expansion of the foam volume typically indicates approximate completion of the reaction, due to the vaporization of water. The actual time will vary with the total amounts of the reactants and their relative ratio, microwave power (wattage) and interior chamber dimensions, which may be readily determined by routine experimentation as described in the Examples. A variety of commercially available microwave cookers or ovens (i.e., microwaves) are suitable for use herein, and the particular microwave selected is not critical. However, it is understood that reaction times will increase with lower microwave power, increased interior dimensions, and greater amounts of reactants employed. Typically, reactions will reach completion on the order of minutes, often in approximately 1 minute (e.g., when employing citric acid with glycerol in amounts approximating 12 grams, total). By way of illustration and without being limited thereto, when preparing polymeric foams from citric acid and glycerol, microwave heating should be sufficient to raise the surface temperature of the foam product to approximately 200 to 220° C. Continued or prolonged heating is not preferred, and may result in burning or discoloration of the polymer or foam.

In accordance with an alternative embodiment, one or more optional free fatty acids or their esters may be included in the reaction of the polyol and di- or tricarboxylic acid. Potentially, any fatty acid can be included in the reaction, including those with different chain lengths (i.e., number of $CH_2$ groups), or saturated or unsaturated fatty acids (i.e., those with or without carbon/carbon double bonds), or their esters, or epoxides of fatty acids. Thus, starting fatty acids include fatty acids of the formula $R_3$—$COOR_x$ wherein $R_3$ is a saturated or unsaturated, straight or branched chain hydrocarbon, and $R_x$ is H or an alkali metal, branched or straight chain alkyl or alkenyl groups, aromatic containing groups, or glycerides (mono-, di- or triglyceride). It is also recognized that the $R_3$ moiety encompasses hydrocarbons which may be optionally substituted or epoxidized. Epoxidized fatty acids may be produced using the same techniques described above for the epoxidation of oils. Preferred starting fatty acids include, but are not limited to free and esterified fatty acids containing from 3 to 23 carbon atoms. Examples of free fatty acids include, but are not limited to, stearic acid and lauric acid.

Upon completion of the reaction, the polyol:carboxylic acid polyester polymeric foam may be recovered for immediate use, or may be subsequently cured using lower temperatures (e.g., approximately 100° C.) and/or molded as described below. In contrast with those foams produced by other techniques, no further processing is required to remove residual water or other reactants, catalysts or solvents.

The physical properties of the foams (e.g., appearance, texture, stickiness, firmness, springiness, tensile strength, and elongation) will vary with the particular carboxylic acid and polyol or ester thereof reacted, the inclusion of optional fatty acid reactants, and their relative amounts. Cross-linking between the selected esterified carboxylic acid moieties within the polymer will also effect these physical properties. Thus, the relative amounts of these reactants may be determined by routine experimentation to produce foams exhibiting the desired properties. However, in general, the molar ratio of the di- or tricarboxylic acid to the polyol moiety is preferably equal to or above approximately 0.45:1.0. Ratios below this level (lower carboxylic acid) typically do not produce stable solid-phase foams. Preferred molar ratios of the di- or tricarboxylic acid to the polyol are between 0.45:1.0 to 2.0:1.0. Greater relative amounts of the carboxylic acid may be used, causing the resultant foams to be more brittle and exhibit reduced strength. Because epoxidized oils such as described above typically comprise glycerides of a variety of different fatty acids, the properties of the resultant foams are understandably more variable. By way of example and without being limited thereto, the molar ratio of the di- or tricarboxylic acid to the epoxidized oil is preferably equal to or above approximately 0.25.

Though the foams produced solely from the di- or tricarboxylic acid with the polyol or ester thereof exhibit excellent stability and physical properties, it is understood that one or more adjuvants or additives may be included to enhance or alter the properties of the foam. Suitable additives include, but are not limited to, starches, cellulose, silica, agar, boric acid, and inorganic salts such as ammonium nitrate, potassium nitrate, ferrous sulfate, manganese sulfate, magnesium sulfate, zinc sulfate, potassium+phosphate, sodium+thiosulfate, sodium+phosphate, calcium chloride and cupric sulfate.

The polyol:carboxylic acid polyester foams produced in this invention exhibit high thermal stability, up to 325° C., and degradation resistance to solvents inorganic acids and weak alkalines. The foams also absorb water in a sponge-like-manner, albeit with some flaking and disruption of their cell structure. The foams are stable for prolonged periods of over two years when maintained at room temperature. In an optional embodiment, the polymeric foams may be cured by heating in a conventional oven as described in Example 2, and cured foams may exhibit higher tensile strength and elongation. Foams produced with or without curing may be ground and compression molded without addition of additives. Thus, the foams produced herein may be utilized as a biodegradable substitute for petroleum-based foams, such as for packaging materials, molded foams, extruded plastics and the like.

The following examples are intended only to further illustrate the invention and are not intended to limit the scope of the invention which is defined by the claims.

Example 1

In this example copolyesters of glycerol and citric acid were produced through various heating methods (hotplate heating, autoclaving, oven convection heating, and microwaving) without addition of any external catalysts. The response of various ratios of citric acid and glycerol blends was examined.

Reagents

Three different anhydrous citric acid sources were employed: Food Grade (Duda diesel LLC, Madison, Ala.), 99% Reagent grade (Sigma-Aldrich, St. Louis, Mo.) and 99.5% Reagent grade (ACROS Organics, Morris Plains, N.J.). Unless otherwise indicated the 99% Reagent grade (Sigma) was employed in all experiments. Glycerol, 99+% (Acros) was employed in all tests.

Preparation of Blends and Experiments

The following citric acid:glycerol molar ratio blends were prepared for heating tests: 2:1, 1.4:1, 1:1, 0.7:1, 0.5:1, 0.34:1, 0.25:1, 0.16:1, and 0.12:1 respectively. Each formulation consisted of 12 grams of reagents and was mixed thoroughly together by hand with the aid of stainless steel spatula within their respective heating vessels. For microwaving, a silicone muffin pan (70 mm diam.×30 mm H; 80 mm$^3$ cap.) (Wilton Industries, Woodridge, Ill.) was employed. Microwave heating was conducted with an Ethos EX microwave Labstation (Milestone Inc., Shelton, Conn.). The microwave was equipped with internal IR-temperature sensor (not used as a feedback control for regulating microwave intensity) and ATC-FO fiber optical probe. This microwave was rated 1200 Watt with a 41,906 cc cap. and was equipped with a turntable. A single silicone pan was heated within the microwave employing the 100% power level intensity per treatment. Vessels were microwaved for 60 sec. In some cases samples were heated for 48 sec and compared with 60 sec samples. In other heating methods, citric acid:glycerol blends of 12 grams were prepared in aluminum weighing pans (7.62 cm diam×1.51 cm D; 80 mm$^3$ cap.) (Cole Parmer, Chicago, Ill.). Samples were heated in laboratory oven (Model 1329-2, Sheldon Manufacturing Inc., Cornelius, Oreg.) at a constant temperature of 100° C. for 12, 72, 96 and 120 hrs. Hotplate heating was conducted on a Hotplate/stirrer (Model PC-320-575 watt, Corning, Lowell, Mass.) preheated surface to 270° C. Blends in pans were heated on the hotplate until bubbling ceased, e.g., 4:44 min, achieving a polymer surface temperature of 223° C. Surface polymer temperatures of the blends were measured with an infrared laser sighting thermometer (Model WD-39644-00, Oakton, Vernon Hills, Ill.) when appropriate. Autoclave heating was achieved at 45 min at 121° C. at 0.103 mPa by placing pans inside a polycarbonate Nalgene Bio-safe box (7L×18.4H×17W cm) (Thermo Fisher Scientific Intern., NY). At the end of heating treatments, citric acid:glycerol blends were rated for their physical appearance, weighed and analyzed by FT-IR Spectroscopy.

The physical stability of 2:1, 1.4:1, 1:1, 0.7:1, and 0.5:1 molar ratio of citric acid:glycerol blends obtained from microwaving were tested in alkaline and acid environments. Three replicates were conducted for each treatment. A 0.2 g polymer sample was immersed in 10 ml of 0.0, 0.1, 0.5, or 1.0 M HCl or NaOH and incubated at 25° C. for 72 hrs. Samples were filtered through Whatman filter paper dried at 40° C. for 5 days and then weighed to determine weight loss and thus percent degradation calculated.

To demonstrate the influence of the vessel type employed in a microwave experiment, 12 grams of 1:1 molar ratio of citric acid:glycerol blend were prepared and microwaved for 60 sec in a muffin pan, a miniature Bundt pan (70 mm diam.×30 mm H; 80 mm3 cap.) or a cake baking pan (22.5 cm diam×5.0 cm H; 1800 cm$^3$ cap.). In some cases, citric acid:glycerol molar ratios of 2:1, 1:1, 0.7:1 and 0.5:1 were microwaved for 60 sec and keep at laboratory room temperature for 1 yr and then analyzed by FT-IR and DSC and compared to 1-day old samples.

Fourier Transform-Infrared (FT-IR) Spectroscopy

FT-IR spectra were measured on an Arid Zone FTIR spectrometer (Model ABB MB-Series, Houston, Tex.) equipped with a DTGS detector. Absorbance spectra were acquired at 4 cm$^{-1}$ resolution and signal-averaged over 32 scans. Interferograms were Fourier transformed using cosine apodization for optimum linear response. Spectra were baseline corrected, scaled for mass differences and normalized to the methylene peak at 2927 cm$^{-1}$ Thermal Analysis TGA and Degradation Kinetics TGA was performed using a Model 2050 TGA (TA Instruments, New Castle, Del.), where pure citric acid and a 1:1 molar ratio of citric acid:glycerol blend were heated in a platinum pan from 25 to 800° C. For decomposition kinetics analysis, each sample (10-20 mg) was heated under a nitrogen atmosphere at 3 different heating rates: 10, 15 and 20° C./min, to 800° C. This data was analyzed using the TA Advantage Specialty Library software (TA Instruments), which operates in accordance with ASTM Standard E1641, "Decomposition Kinetics by TGA" and the activation energy ($E_a$) values were obtained at 50% conversion. The derivative TGA (Weight %/min) of each sample was obtained from the software using the 10° C./min run.

DSC (Differential Scanning Calorimetry)

All experiments were performed on a TA Instrument DSC, Model Q2000 (TA Instruments) with RCS cooling system (New Castle Del., USA). Baseline was calibrated with sapphire disk. Samples weighed to within 5-8 mg were encapsulated in Tzero aluminum pans. The DSC was purged with dry nitrogen at 50 ml/min. The conventional heat/cool/heat cycling experiment was done at 10° C./min for heating and 5° C./min for cooling at the temperature range of −40° C. and 180° C. The modulated DSC was done with modulation temperature of 1° C., modulation interval of 60 seconds, ramp rate of 3° C./min at the temperature range of −40° C. and 180° C. The data resulting from the thermal transitions was obtained using the Universal Analysis software (TA Instruments).

Results and Discussion

FTIR Analysis

Figure 2:
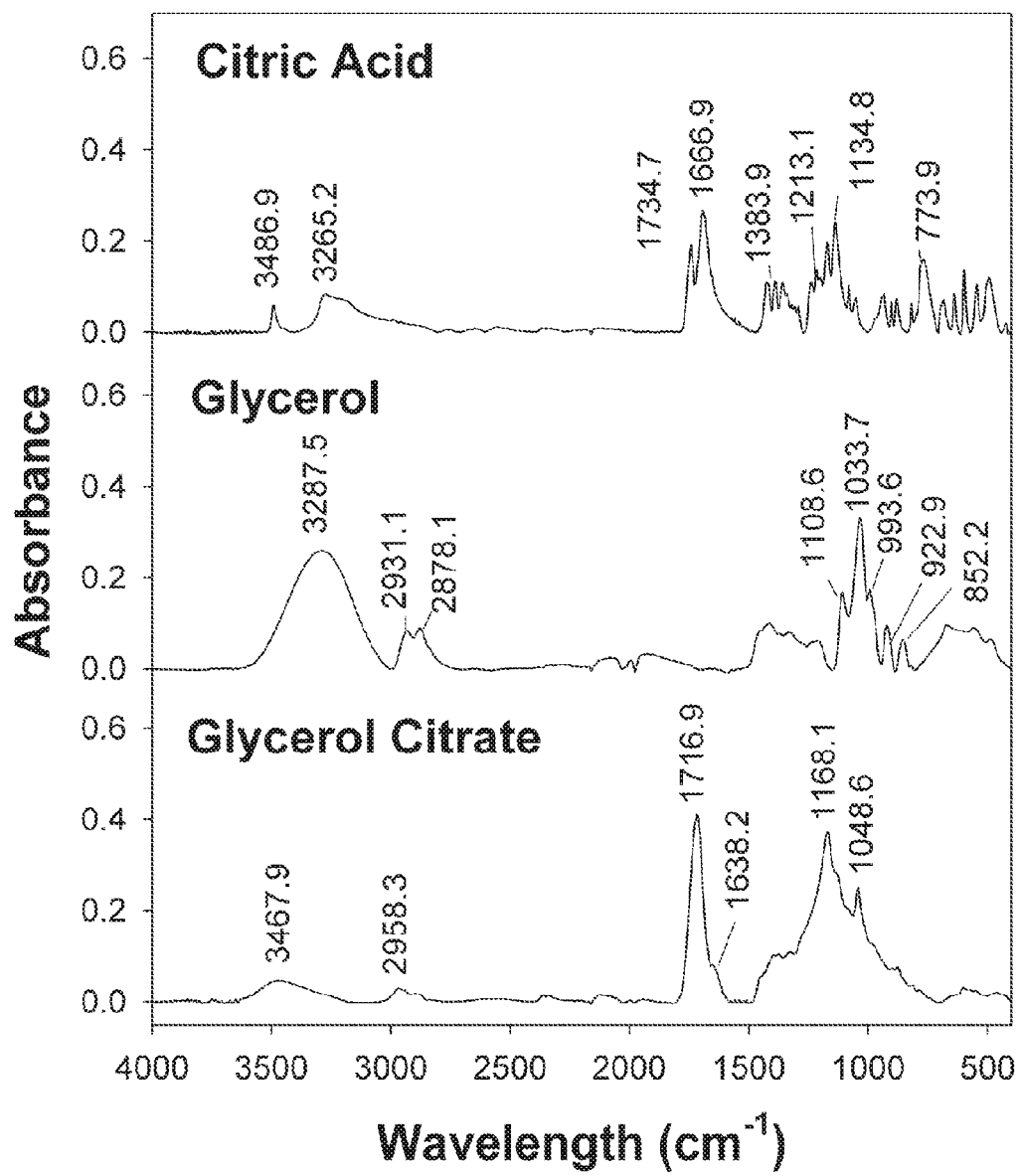
FIG. 2 shows the FT-IR spectra: anhydrous reagent grade citric acid, glycerol and 1:1 molar ratio of citric acid:glycerol blend microwaved for 60 sec.
Figure 3:
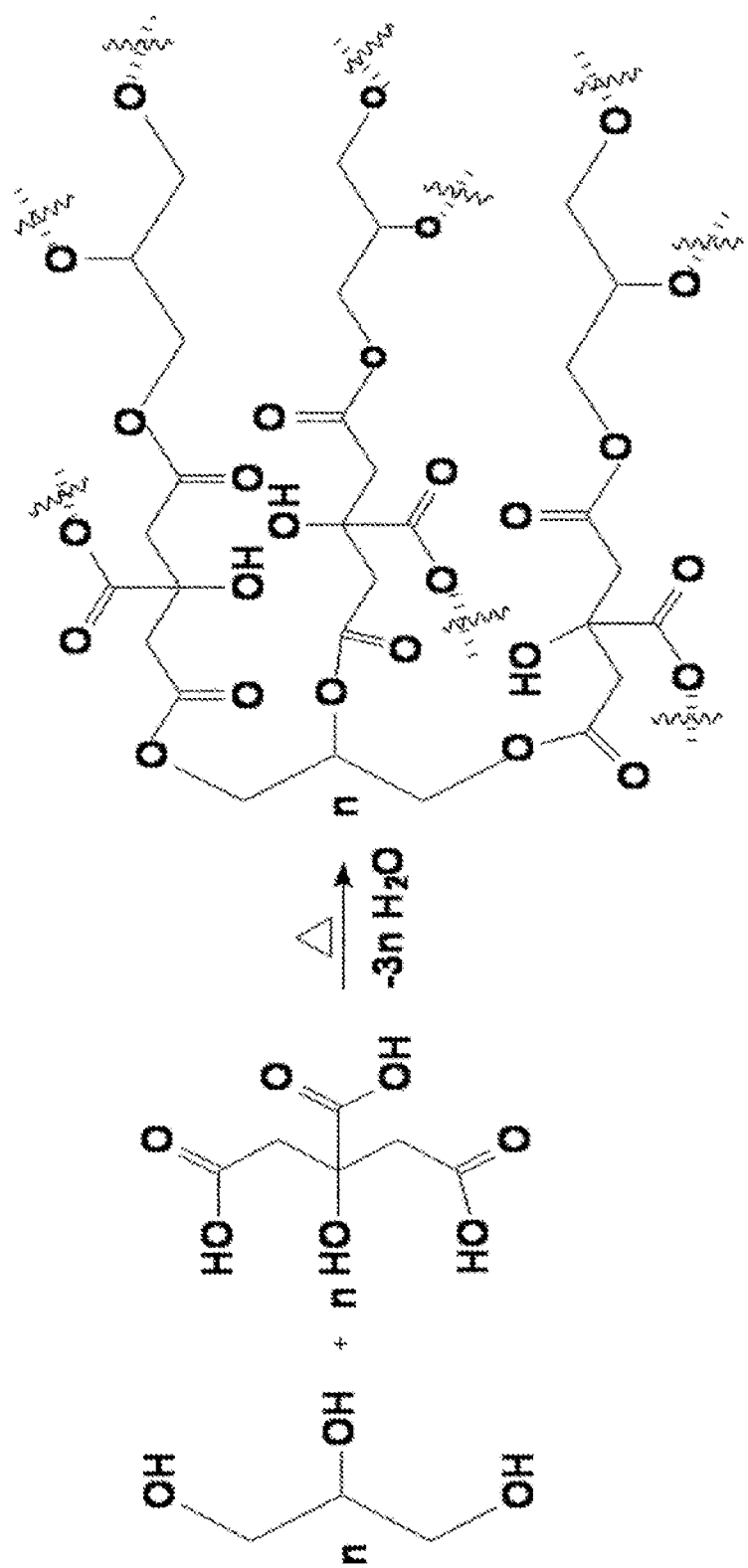
FIG. 3 shows the stoichiometric reaction of glycerol with citric acid to produce glycerol citrate copolyester employing microwave heating (proposed structure of resultant polymer).
Figure 4:
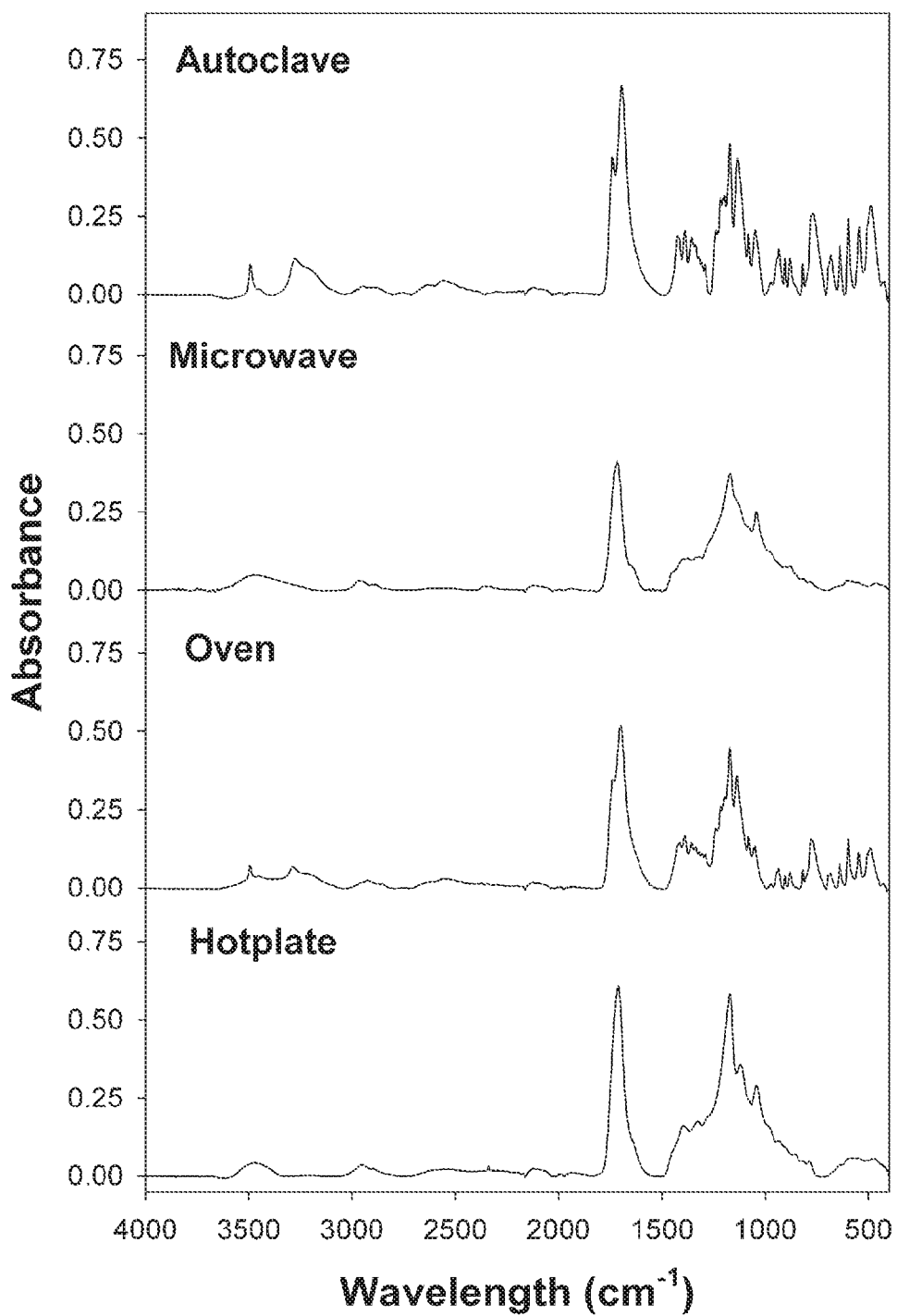
FIG. 4 shows the FT-IR spectra for 1:1 molar ratio of citric acid:glycerol blend prepared as follows: autoclaved at 121° C. for 45 min at 0.103 mPa; microwave for 60 sec; Oven at 100° C. for 120 hr; and hotplate 4.44 min. Note that the oven heating retains peaks of the citric acid indicating the citric acid did not react as completely as in the hotplate and microwave heating.

A close examination of the 1900-1600 $cm^{-1}$ region of the FT-IR spectrum of the anhydrous citric acid used in these reactions exhibited bands which could aptly be interpreted as consisting of a small conformational mixture of its anhydride 1845 $cm^{-1}$ and 1740 $cm^{-1}$ and the mainly free carboxylic acid conformer 1730 $cm^{-1}$ bands as schematically depicted in FIG. 1A and represented in the spectrum in FIG. 1B. This spectral interpretation is consistent with that of unconjugated cyclic anhydrides (Lin-Vien et al. ibid). With this observation in mind, it becomes more understandable how citric acid readily reacts with glycerol in the absence of a strong acid catalyst usually necessary to effect esterification of alcohols with other weaker carboxylic acids. As esterification is a reversible reaction one can invoke Le Châtelier's Principle to rationalize the rapid reaction with the alcohol by the initially small amount of the reactive anhydride component of citric acid present. This is essential to drive the reaction forward and eventually to completion as more anhydride is produced coupled especially to the condensation by-product, water, driven off under microwave reaction conditions. Although in an earlier study Pramanick and Ray[1] had suggested that the 3449 $cm^{-1}$ broad band to be unreacted internal carboxyl and tertiary hydroxyl groups of citric acid, in our hands or under microwave radiation, the only discernible unreacted component seems to be the tertiary hydroxyl groups of citric acid that are sterically encumbered to be reached even in this reaction environment (FIGS. 2-4).

Figure 5:
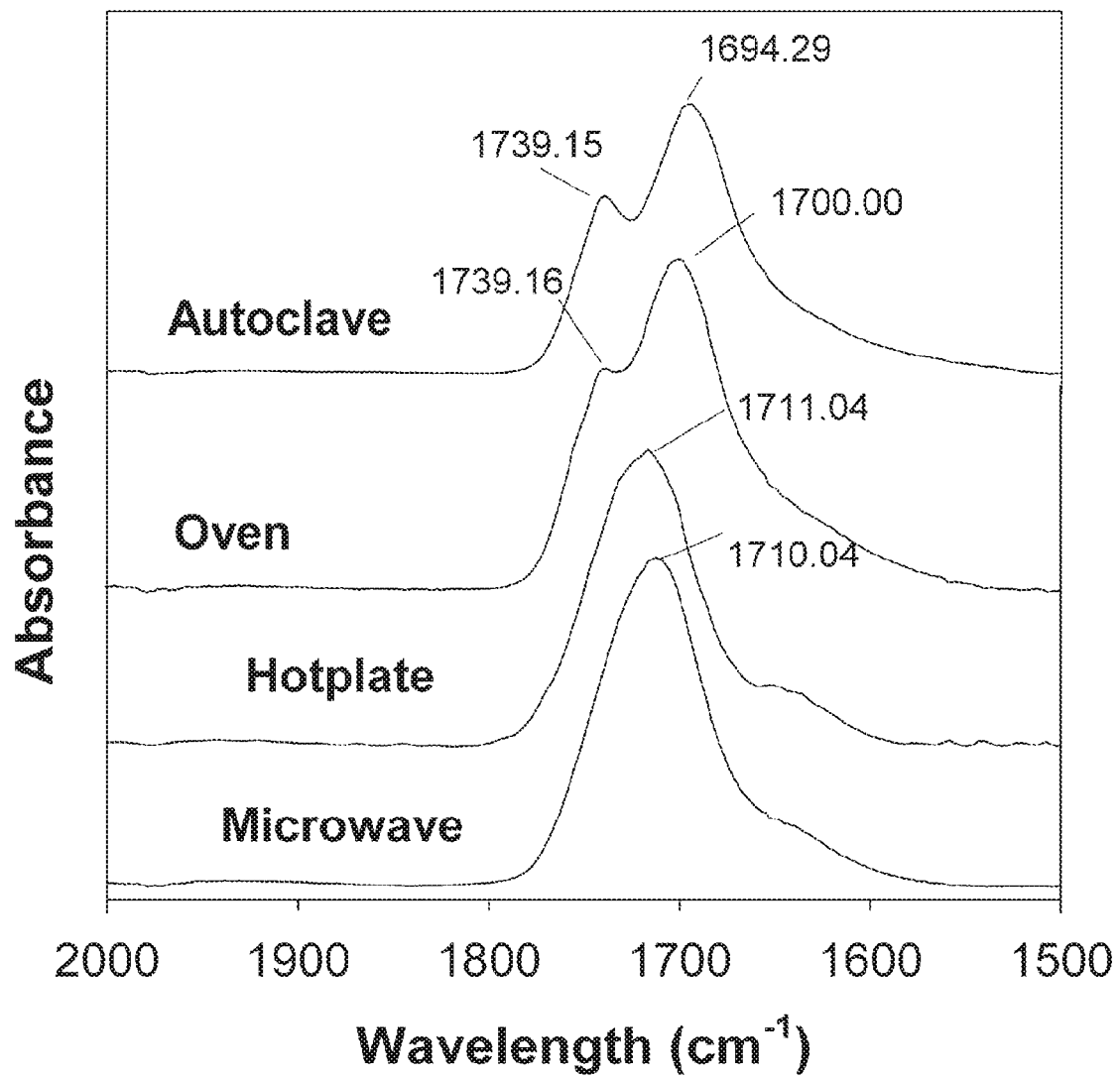
FIG. 5 shows the FT-IR spectra (1500 to 2000 wavenumbers) for 1:1 molar ratio of citric acid:glycerol blend prepared as follows: Autoclaved at 121° C. for 45 min at 0.103 mPa.; Microwave for 60 sec; Oven at 100° C. for 120 hr; and Hotplate 4.44 min.

The method of reacting citric acid:glycerol molar blends resulted in products with different physical properties (Table 1). When an autoclave is employed as the method of heating, only a liquid or sticky gel was obtained from the citric acid: glycerol blends. In many cases the undissolved citric acid was visibly present in the gels (Table 1). Clearly, there was not enough heat to drive the reaction to completion. An alternative explanation may lie in the reversibility of esterification reaction. In a steam environment, the forward reaction is thwarted, again in accordance with Le Châtelier's principle. Examination of the FT-IR of 1:1 molar citric acid:glycerol blends from the autoclaved treatments exhibits the ester peak at 1739.15 $cm^{-1}$ and a carboxylate peak at 1694.29 $cm^{-1}$ (FIGS. 4 and 5). This suggests that an incomplete reaction was observed. Autoclave heating was clearly was inadequate to produce polymerization but did result in preliminary polymerization as shown by the FT-IR. Employing the hotplate to heat the citric acid:glycerol blends resulted in entirely different physical products. These products were essentially rubbery gels punctuated with a myriad of air bubbles. When employing an oven, the resultant blends were hardened into a brittle translucent plastic-like film after 120 hrs of heating at 100° C. Use of convention oven heating with this temperature has been previously employed to obtain this physical construct (Holser. ibid). FT-IR analysis revealed the presence of the polyester glycerides in all resultant products regardless of the method of heating (FIGS. 4 and 5).

Citric acid:glycerol blends with molar ratios of 2:1, 1.4:1, 1:1, 0.7:1, and 0.5:1, produced distinct puffed white foam structure when microwaved for 60 sec (Table 1). During the microwaving process, considerable bubbling was observed. We attribute this to the vaporization of the water as steam which also results in vigorous mixing of the formulations. Microwaving the various citric acid:glycerol blends resulted in foam products that conformed to the shape of the pan employed. However, when employing the large surface area cake pan (i.e., 1800 $mm^3$ cap.) the blend failed to solidify and only formed a liquid. FT-IR examination of these citric acid: glycerol blends revealed the occurrence of distinct esters (FIGS. 4 and 5). It should be noted that by increasing the microwave reaction time from 48 sec to 60 sec results in the formation of larger foams suggesting that a more complete reaction occurred. About 25 to 30% of the original blend weight was lost in the 48 sec microwave treatment while 35 to 45% of original blend was lost in the 60 sec microwave treatment (data not shown). We have attributed this weight loss to the by-product, water, generated and lost in the condensation reaction of ester formation. This water by-product loss by vaporization in microwave heating drives the reaction to completion in accordance with Le Châtelier's principle as mentioned earlier. But prolonged microwave treatment results in burning and discoloration of the foam material.

Citric acid and glycerol have melting points of 153° C. and 17.8° C. and boiling points of 175° C. and 290° C., respectively. The resultant polyester glyceride did not have an observable melting point, even after heating to 325° C. When the microwaved polyester glyceride foams were immersed in water they behaved in a sponge-like manner; however, considerable flaking and foam rupture ensued; but little loss of the original material weight (Table 2). Treatment with acid (i.e., 0.05 to 1.0 M HCl) did not completely degrade the polyester glyceride after 72 hours. For example, the 1:1 M citric acid:glycerol blend only exhibited 8% degradation in 1 M HCl while the 2:1 M blend exhibited 70.5% degradation (Table 2). In comparison, alkaline treatment with 0.5 and 1.0 M NaOH caused visible deterioration and yellowing of the solution, a situation which was not observed employing lower alkaline or acid concentrations. For example, 1.4:1 and 1:1 citric acid:glycerol blends in 0.5 M NaOH showed 97 and 96% deterioration, respectively.

Figure 6:
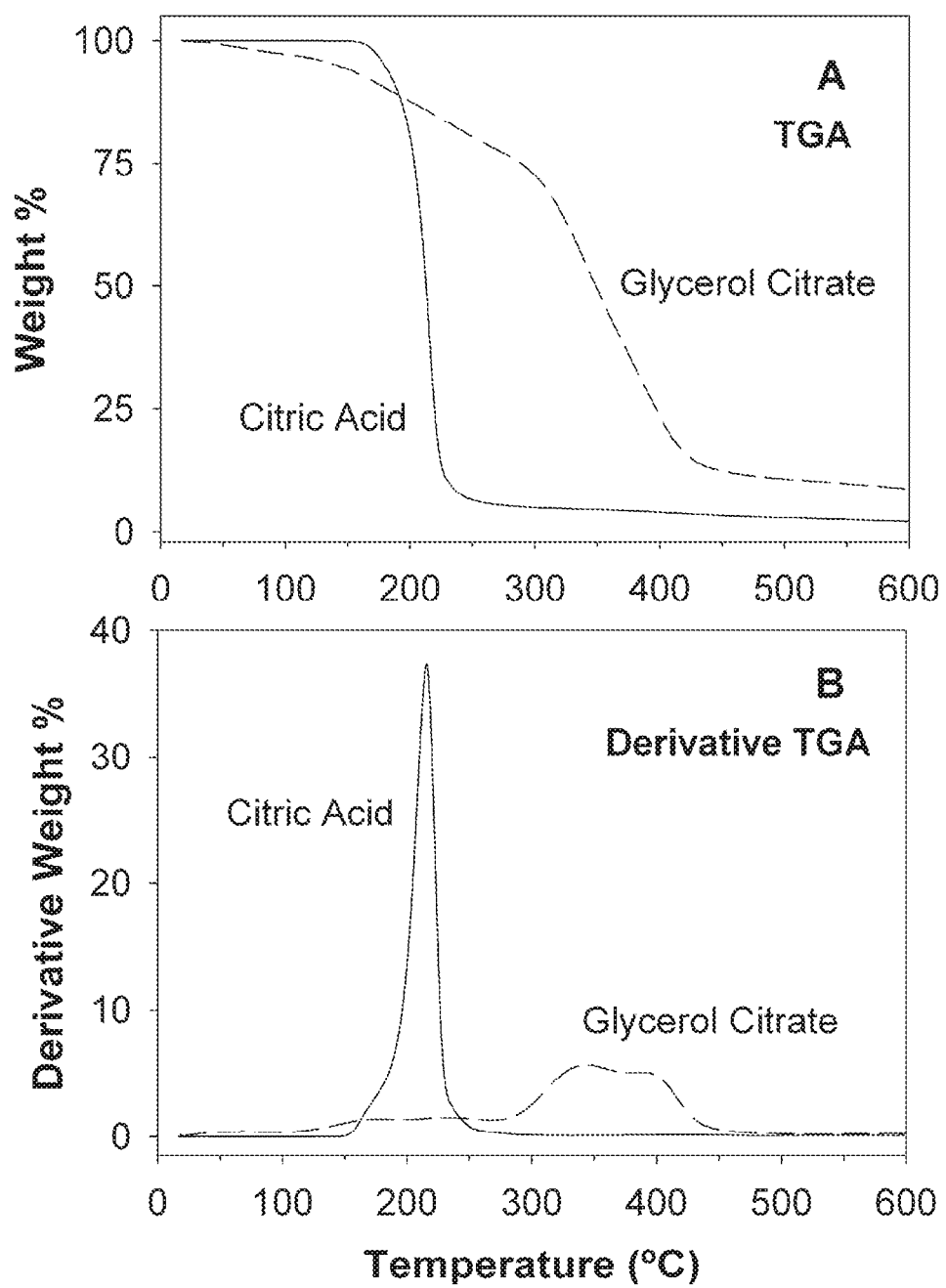
FIG. 6 shows the TGA Analysis as described in Example 1. (A) TGA profile of citric acid and 1:1 molar ratio of citric acid:glycerol blend. (B) TGA derivative of citric acid and blend.
Figure 7:
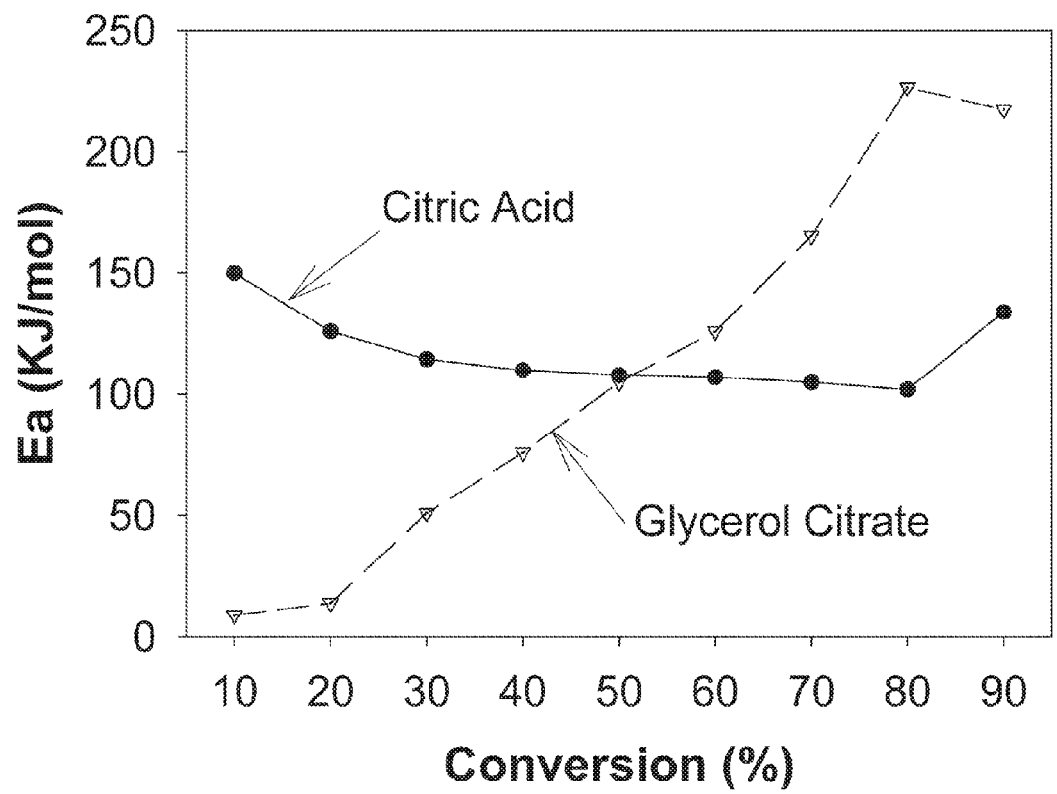
FIG. 7 shows the degradation kinetics of citric acid and 1:1 molar ratio of citric acid:glycerol blend.

The TGA scan of pure citric acid exhibited one major peak at 214° C. (FIGS. 6A and 6B). The 1:1 M citric acid:glycerol blend, the polyester glyceride polymer, showed a different profile compared to the pure citric acid. The blend polymer exhibited a profile that gradually lost weight, unlike pure citric acid which exhibited a sharp drop in weight. It is clear that the glyceride blend resists degradation making it more heat stable than citric acid. It is also clear from FIG. 6b that the presence of three new species appeared in the blend degrading at 156, 313, and 396° C. It is also important to mention that two of these newly formed materials started degrading at a temperature much higher that pure citric acid as shown in the FIG. 6B. This indicates some sort of interaction between citric acid and glycerol that needs to be investigated. Additionally, TGA data were used to determine the degradation kinetics of neat citric acid or the glyceride blend. Three heating rates, 10, 15 and 20° C./min, were used to calculate the activation energy of degradation (Ea) according to Flynn and Walls (Poly Lett 1966, 4:323) based on the following equation (1):

$$\log\beta \cong 0.457\left(-\frac{Ea}{RT}\right) + \left[\log\left(\frac{AEa}{R}\right) - \log F(a) - 2.315\right] \quad (1)$$

where β is the heating rate, T is the absolute (Kelvin) temperature, R is the gas constant, a is the conversion, F(a) is the function of degree of conversion, Ea is the activation energy, and A is the pre-exponential factor. According to this equation at the same conversion, Ea can be obtained from the slope of the plot of log β versus 1000/T (K). The Ea was calculated using the software provided by the TGA manufacturer (TA Instruments). The degradation mechanism of both samples can be obtained by plotting the percent degradation conversion versus Ea as shown in FIG. 7, where a horizontal line means a one-step degradation, otherwise it is a multi-step process. Although with varying Ea values for each percent conversion, pure citric acid exhibited a one-step degradation mechanism (FIG. 7), while the 1:1 M ratio glycerol citrate copolyester showed multi-step processes indicating interaction. It is also clear from the profile that the glycerol:citrate blend gives a higher Ea at higher percent conversion.

Figure 8:
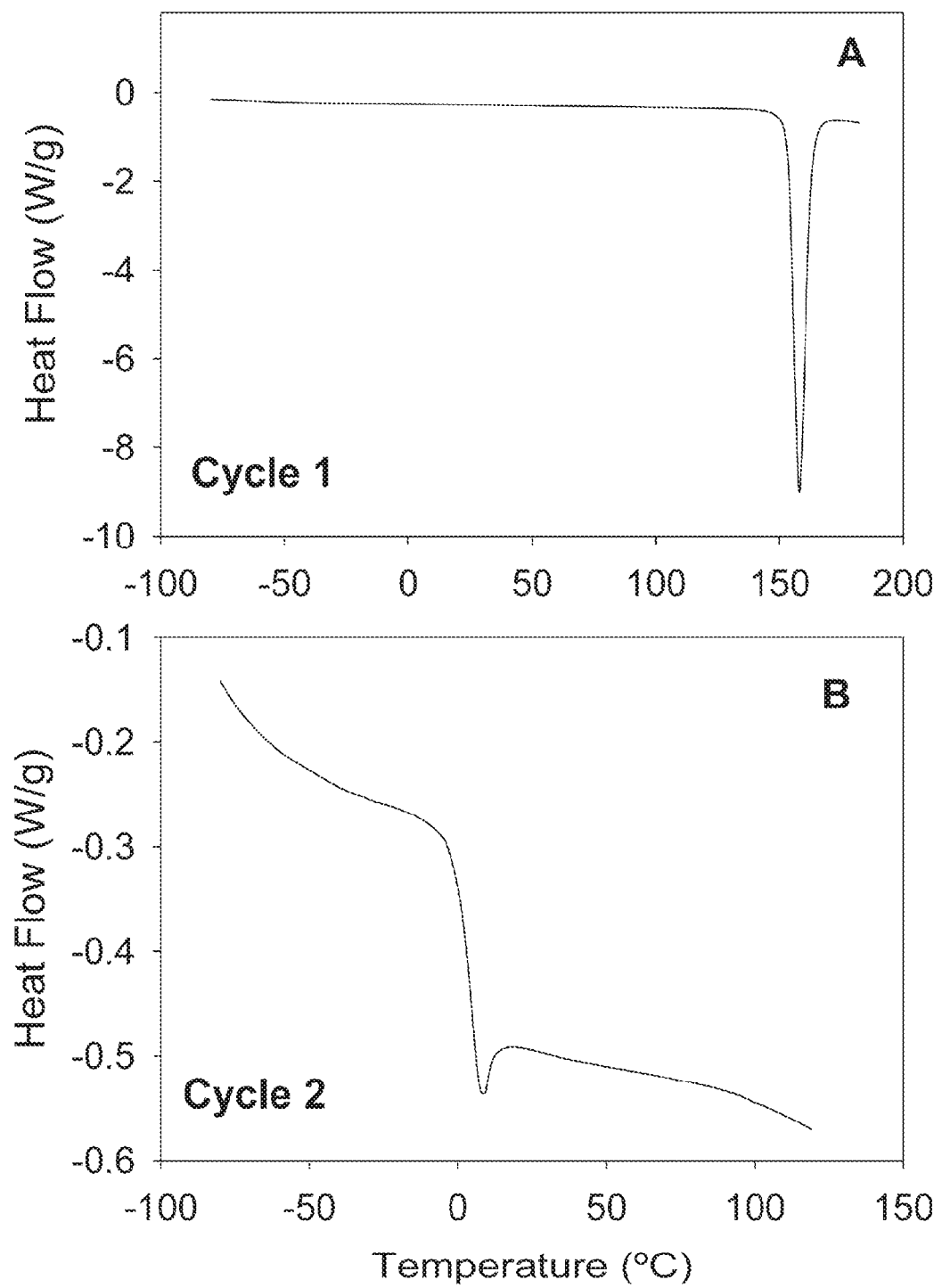
FIG. 8 shows the DSC of citric acid.

The DSC profile of citric acid was done by subjecting the sample for two cycles, heating and cooling (FIGS. 8a and 8b). The first cycle (heating) of pure citric acid showed a melting peak at 155.1° C. (ΔH=222.1 J/g·° C.), while the second cycle (cooling) exhibited a glass transition (Tg) at 2.47° C. (ΔCp=1.3 J/g·° C.). It is clear that citric acid was crystallized under different specific processing conditions, which explains why it did not crystallize during the cooling cycle. There is a dip under the Tg that resembles a melting peak, but in reality it is an enthalpic relaxation (FIG. 8b). The melted citric acid molecules relaxed to the most stable thermodynamic state, where the material is at its lowest energy levels and it is brittle (relaxation).

Figure 9:
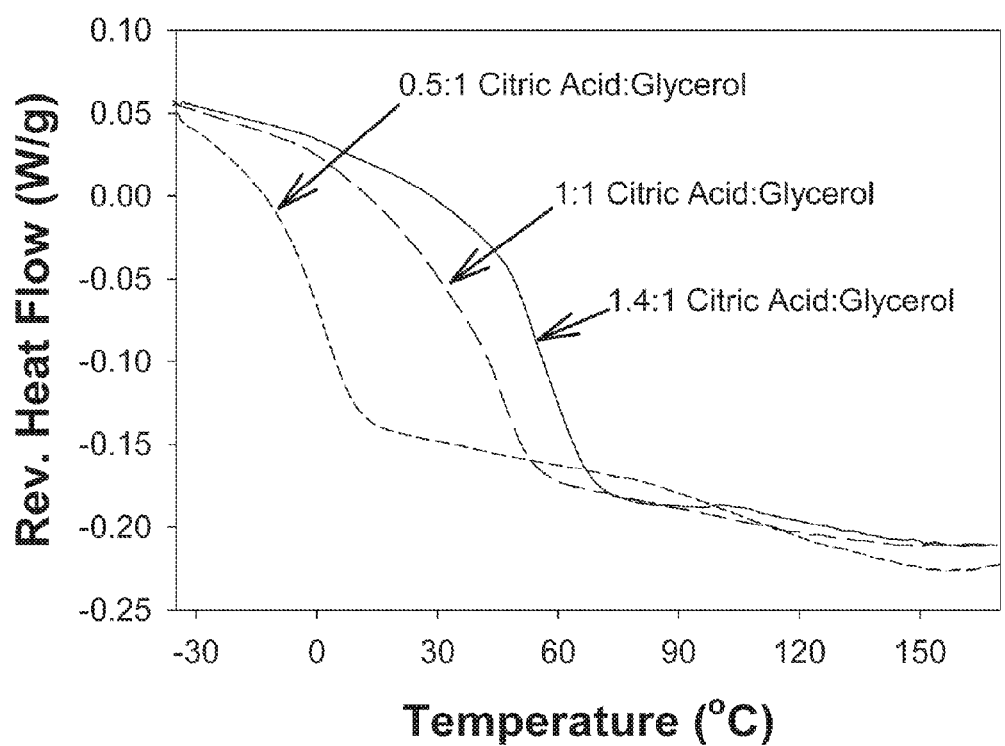
FIG. 9 shows the DSC of glycerol citrate copolyesters. Reversible heat flows of 1.4:1, 1:1 and 0.5:1 ratios of citric acid and glycerol from the modulated DSC.

The conventional heat/cool/heat cycling test of the polymer obtained from 1:1 molar ratio of the citric acid and glycerol was conducted and compared with citric acid (FIG. 9). No citric acid melting peak was observed in the DSC curve for the polymer indicating that all citric acid was reacted. The DSC curves of the polymer during the first and second heating cycles didn't show much difference implying that the polymerization was substantially completed. The reversible heat flow in the modulated DSC confirmed the transition found in the conventional DSC was the glass transition. The reversible heat flow thermograms from modulated DSC experiments of the polymers with three different molar ratios (1.4:1, 1:1, and 0.5:1 of citric acid:glycerol) are shown in FIG. 9. The Tg's and ΔCp of 1.4:1, 1:1 and 0.5:1 molar ratio of the polymers were measured at 56.6±3.2, 47.6±0.7 and −4.98±0.4° C., and 0.62±0.05, 0.57±0.01 and 0.49±0.13 J/g·° C., respectively. The polymer of 1.4:1 ratio showed higher Tg than others presumably due to the highest level of cross-linking. The lowest Tg of 0.5:1 molar ratio polymer may attribute to the partially or unreacted glycerol.

The 2:1, 1:1, 0.7:1 and 0.5:1 citric acid:glycerol molar polyester blends were found to be stable after a year when maintained at room temperature in the laboratory environment from FTIR analysis. These molar blends did not physically deteriorate, discolor, or take up moisture when compared to day old molar blends (data not shown). In addition, FT-IR and DSC analysis of 1-yr old copolyester blends revealed it to be similar to the freshly prepared blends (Data not shown).

Microwave radiation accelerates the chemical reaction processes by electromagnetic energy radiation rather than by using heat conduction and obtains higher chemical conversions than by conventional heating (e.g., gas burners, hotplates, convection ovens or autoclaving) (Berlan. Radiat Phys Chem 1995, 45:581; Klán et al. J Photochem Photobiol 2001, 143:49; Senise et al. Micro. Optoelect. 2004, 3:97; and Taylor et al. Developments in microwave chemistry. Evaluserve Special Rept, Evaluserve Inc., Saratoga, Calif., 2005). Microwave chemistry may reduce reaction times by a factor of 10-10,000. Precisely how microwave radiation effects chemical reactions is unclear although it is believed to act through a number of mechanisms including: superheating, polarization, dielectric properties, hot spot formations, nuclear spin rotation and spin alignment (Berlan. Ibid; Klán et al. ibid; Senise et al. Ibid; and Taylor et al. ibid). Microwave heating has several advantages over conventional heating such as: accelerated reaction rates, milder reaction conditions, higher chemical yields, lower energy use, different reaction selectivity and uniform heating (Senise et al. Ibid; and Taylor et al. ibid). In this study, microwave heating produces an interesting biopolymer in a fraction of the time required through other heating methods. An advantage of the microwaved glycerol citrate copolyester allows production without catalyst or complicated synthesis. Further, we found the extraction of the polymer from the silicone vessel was unhindered and not attached to the vessels side such as found using the aluminum pans. Unlike in previous studies, where glycerol citrate copolyesters prepared by conventional heating required several days of heating, our glycerol citrate copolyesters only required 60 sec of microwave heating, a considerable reduction in the preparation time (Pramanick and Ray. Ibid; Holser. Ibid; and Budhavaram and Barone. Ibid). The microwave method of heating produced unique materials and merits further investigation. In addition, we readily obtained a solid polymer rather than a liquefied polymer as some investigators noted (Holser. Ibid; and Budhavaram and Barone. Ibid). The solid amorphous polymer obtained by Pramanick and Ray (ibid) mimicked that obtained in our study but was produced through a considerably more complicated synthesis procedure compared to ours. Microwave heating apparently heats and mixes reactants thus resulting in a relatively uniform polymer product. In employing open container vessels in the microwave, the steam generated is removed during the heating processes allowing for the reaction to proceed more rapidly than other heating methods. Therefore numerous polymer compositions can be prepared quickly for subsequent evaluation (i.e., FTIR, TGA, DSC etc.).

Example 2

The purpose of this Example was to characterize the physical properties of the citric acid:glyceride polyester foams described above affected by thermal curing.

EXPERIMENTAL

Materials

Glycerol used was vegetable based, food grade, (99.5%) and obtained from U.S. Glycerin (Kalamazoo, Mich.). Citric acid was anhydrous, granular, food grade (99.9%) and obtained from DudaDiesel LLC (Madison, Ala.).

Equipment and Polymer Sample Preparations

A 1:1 molar ratio of citric acid:glycerol consisting of 12 grams total was mixed thoroughly together by hand with the aid of a stainless steel spatula within a silicone muffin pan (68 mm diam. outside diam×30 mm H; 55 $mm^3$ cap., Wilton Industries, Woodridge, Ill.). Vessels were microwaved for 60 sec with an Ethos EX microwave Labstation (Milestone Inc., Shelton, Conn.). The microwave was equipped with internal IR-temperature sensor (not used as a feedback control for regulating microwave intensity) and ATC-FO fiber optical probe. This microwave was rated 1200 Watt with a 41,906 cc cap. and was equipped with a turntable. A single silicone pan was heated within the microwave employing the 100% power level intensity per treatment. Surface temperatures of polymers were measured with an infrared laser sighting thermometer (Oakton, Vernon Hills, Ill., model WD-39644-00).

Physical Measurements of Polyester Foams

After microwaving, the polymer foams were cooled for about one hour to reach room temperature (22±1° C.). Foams were then weighed and measured for their height, width and diam and volume (cm$^3$). To study the influence of post microwave oven curing, polyester glycerol:citrate foams were cured in a laboratory oven (Sheldon Manufacturing Inc., Cornelius, Oreg., model 1329-2) at a constant temperature of 100° C. for 0, 6, 24, 48, or 72 hrs. Three samples were conducted per treatment and measurements were taken one hr after removal from oven heating. Polymers were then measured for moisture content (MC) with a halogen moisture analyzer (Model HR 83, Mettler-Toledo Inc., Columbus, Ohio). Oven weights were taken before and after curing and % oven weight loss (OWL) was determined using the formula:

$$\% \text{ OWL} = (\text{wt.}_{final} - \text{wt.}_{original}) / \text{wt.}_{original}) \times 100$$

To determine the extent of polymerization affected by curing, 13 mm diam cores (~2.25 g) of foams were extracted from the center of the foams with a number 7 cork borer and soaked in deionized water for 24 hrs. Samples were then removed, dried for 96 hr at room temperature and weighed again. Percent hydration weight loss (HWL) was determined using the formula:

$$\% \text{ HWL} = (\text{wt.}_{hydrated} - \text{wt.}_{original} / \text{wt.}_{original}) \times 100$$

Texture Analysis

Texture measurements of firmness and springiness values were conducted on the polyester foams. A Stable Micro Systems TA-XT21 Texture Analyzer (Stable Micro Systems, Godalming, Survey, U.K.) equipped with a plastic plunger (35 mm diam) operated at a plunger speed of 1 mm/s with a compression force value (kg) at 30% compression and a compression depth 15 mm, measured in the center of 3 polyester foam replicates. Firmness corresponds to the maximum peak force value (kg). Springiness is a ratio of the constant force during time holding to the peak force before holding. The texture analyzer was operated through Texture Expert software (Stable Micro Systems).

Mechanical Properties Analysis

Cured polyester polymers were ground in a Wiley mill employing a 1 mm screen. The finely ground sample was then compression molded into tensile bars in accordance with the ASTM D-638-V standard. A tempered stainless steel mold produced four test samples at a time. Sufficient powder (1.5 g) was placed into each of the four molds to obtain well formed bars. Molding conditions were selected to provide a tensile test sample that appeared fully melted in the interior of the bar based on visual lack of graininess. The mold was heated in a hydraulic press (Model C, Carver Inc., Wabash, Ind.) at 125-150° C. under a pressure of 89.6 Mpa/mold for 20 min. Following compression, the mold was removed from the press and allowed to cool at room temperature. Samples were stored in humidity chambers, each set at 23° C. and 30% relative humidity, for five days before testing physical properties. Sample thicknesses were measured at three different locations in the testing region using a micrometer (Model No. 49-63, Testing Machines, Amityville, N.Y.). Moisture contents were measured on a moisture meter (Model MB45, Ohaus, Pine Brook, N.J.). Data values reported are the average of at least four tested bars. Tensile strength (TS), elongation to break (% Elo) and Young's modulus (YM) were evaluated for each sample using an Instron® Universal Testing Machine Model 4201 and are presented as the calculated value ±1 standard deviation. Physical properties were determined with a crosshead speed of 10 mm/min, a gauge length of 7.62 mm, and a 1 kg load cell.

Measurement of Polymer Color

Polyester foam color was read using the Commission International de l'Eclairage (CIE) Lab parameters (L*, a*, b*) with a spectrophoto-colorimeter LabScan XE Scanner equipped with Universal Software v. 4.0 (Hunter lab, Inc., Reston, Va.). The scanner was calibrated with a black and white tile. In this coordinate system, L* value is a measure of lightness (brightness), ranging from 0 (black) to 100 (white); a* value is a measure of redness, ranging from −100 (green) to +100 (red); b* value is a measure of yellowness, ranging from −100 (blue) to +100 (yellow); C*$_{ab}$ value is a measure of Chromaticity (quality of color); and H*$_{ab}$ is a measure of Hue angle (the real color). C* and H* values are given as C*$_{ab}$=√(a*$^2$+b*$^2$) and H*$_{ab}$=arctan(b*/a*), respectively.

Statistical Analysis

Experimental data obtained was analyzed statistically by analysis of variance for statistical significance and multiple comparisons of means were accomplished with Duncan's Multiple Range Test (p=0.05). Pearson correlation tests were conducted on the physical parameters of the polymers as appropriate.

Results and Discussion

Physical Changes in Glycerol Citrate Polyesters

The morphological structure of the glycerol citrate polyester polymer produced in the silicone muffin vessels is a white-opaque colored foam composed of irregular bubbles. The surface temperature of the foams was between 207-210° C. These foams were usually about 50 mm h×70 mm diam and lost about 40% of their original weight of the components added to the vessel. Foams were then cured further by incubation at 100° C. in a convection oven. Curing continues the polymerization/cross-linking reactions and is often peripheral to the actual manufacturing process, normally additives or thermal cooking is employed to control the rate of plastic curing in order to obtain a more satisfactory thermoset plastic (Palumbo and Tempesti. Acta Polym. 1998. 49:482-486). Thermal curing is often conducted to complete the polymerization process and stabilize the polymers physical characteristics (Gamage et al. Polym Eng Sci. 2006. 46:72-90; Nishikubo et al. Polym J. 2008. 40:310-316; and Seppälä et al. U.S. Pat. No. 6,011,021, issued Jan. 4, 2000). Heat curing of plastic polymers by thermal or microwave treatments often results in polymers with distinctly different physical characteristics (Palumbo and Tempesti. ibid.; and Seppälä et al. ibid). By regulating the speed by which plastic polymer hardens and sets, through either heating and/or curing additives plastic manufacturers increase the efficiency of their production methods (Craver and Carraher Jr. Applied Polymer Science: 21$^{st}$ Century, Elsevier Science Ltd, Oxford. 2000). In our case, initially, the foam polyester polymer muffin is firm when immediately removed from the microwave; after 24 hrs at ambient conditions it becomes less firm or increasingly spongy as it accumulates moisture from the air. This is a common problem associated with bio-polymers since they are inherently hydrophilic characteristics (Holser. ibid; Seppald et al. ibid; and Shogren et al. J Bio Mat Bioener. 2007. 1:229-237). Thermal curing treatments decidedly changed the polyester foam muffin physical properties. This is readily illustrated by the changes in the MC, OWL and HWL measurements in foams subjected to oven curing (Table 3). There were significant negative and positive correlations for these measurements with curing time (Table 4). To examine the extent of additional polymerization caused by thermal curing, foams were cored with number 7 cork borer, weighed (≈0.25 g), immersed in distilled water for 24 hrs, removed, dried for 96 hrs in room air, and then weighed again. Thermal curing was found to considerably decrease the percent HWL (Table 3). With increased polymerization and/or cross-linking there will be fewer hydrophilic carboxylic acid and hydroxyl moieties present in the foam. This will provide a polymer with reduced susceptibility to absorbing moisture. There was a significant negative correlation between HWL and curing time (Table 4). Essentially, thermal curing results in a general decrease in MC and HWL and an increase in OWL (Table 3). This decrease in MC represents additional polymerization with the loss of water. Some actions of this process may also be due to polymer degradation resulting from the increased thermal treatment. With the information in hand, it is difficult to separate these two factors—additional studies are in progress to monitor the rate of polymerization. Similarly, polyester foam OWL steadily decreased with the length of thermal curing time (Table 3). For example, OWL in polymers thermally cured showed a gradually decrease, also indicating the loss of water may be associated with additional polymerization. The fact that these values do not equal moisture content, illustrates that simple loss of water does not represent the entire process that occurs with thermal curing.

Curing Polymer Color Changes

Thermal curing resulted in obvious yellowing and darkening of the polymer. Color changes caused by thermal treatments of polyesters are well known (Pohl. J. Amer. Chem. Soc. 1951. 73:5660-5661; Richard. J Text Inst. 1984. 75:28-36; and Wei et al. J Appl Polym Sci. 2006. 101:3330-3335). In our case, this is reflected by a general decrease in the $L^*$ (brightness) and $H^*_{ab}$ (hue angle) values coupled with increases in $a^*$ (redness), $b^*$ (yellowness) and $C^*_{ab}$ (chromaticity) values with increased curing times (Table 5). As the curing times increase $L^*$ and $H^*_{ab}$ values tend to decrease, while the $a^*$, $b^*$ and $C^*_{ab}$ values increase. Practically all the color values ($L^*$, $a^*$, $b^*$, $C^*_{ab}$, and $H^*_{ab}$) were significantly correlated with the curing time (Table 4). In addition, there were high correlations amongst all the color values (Table 6). High correlations also occurred comparing among the $L^*$, $b^*$ and $C^*_{ab}$ values and the physical properties (Table 6).

Texture Analysis of Glycerol Citrate Polyesters

The unique architecture of the glycerol citrate polyester polymer construct (i.e., foam) was amenable to texture analysis with the TA/TX21, without any further sample preparation. Texture analyzer values for firmness and springiness of cured foam samples showed significant correlations with thermal curing times (Table 3). After 6 hrs of curing samples displayed significant firmness and springiness increases compared to the uncured control (Table 3). Six hours of curing resulted in polymers firmness and springiness values increasing 102% and 99%, respectively compared to uncured controls. Increasing curing times up to 48 hrs resulted in even higher firmness and springiness values compared to lesser curings (Table 3). Firmness and springiness increased 202% and 143% for polyesters cured 48 hrs compared to uncured controls. We speculate that firmness increases would be a result of increased polymerization and/or cross-linking due to additional thermal treatment. However, samples cured longer (i.e., 72 hrs) exhibited substantially less firmness and springiness compared to the 48 hr treatment with only 104% and 95% increases, respectively, compared to untreated controls. We can speculate that too much thermal baking results in degradation of the polymer structure as evidenced by the decrease in springiness and firmness and increased color change (vide supra). There were close associations between springiness, firmness, HWL, OWL, and MC (Table 4). However, poor correlations occurred between oven curing time and texture profile analysis properties, illustrating that an optimum cure time was probably achieved at 48 hr to obtain the highest springiness and firmness values and these values declined with increased curing.

Instron Analysis of Molded Bars

Physical property data of glycerol citrate polyester polymer molded bars are presented in Table 7. The stress-stain curve (not shown) displayed no unusual features. All thermal curing treatments resulted in significant changes in tensile strength and elongation compared to the uncured treatment (Table 7). For example, 6 hr thermal curing resulted in a tensile strength of 34.6 MPa, an improvement of 162%, compared to uncured controls. Samples treated with 24 hr thermal curing resulted in further tensile strength improvement to 39.1 Mpa, a 155% increase compared to uncured controls. Increased cure times beyond 48 hr resulted in a slight reduction in TS relative to the 6 hr cure time. When this is coupled with the color data it suggests that polymer degradation is taking place leading to a weaker polymer network. In addition to higher tensile strengths, increased elongation was also achieved with thermal curing (Table 7). For example, 24 hr thermal curing resulted in molded bars exhibiting an elongation percentage of 7.1%, an improvement of 103% over controls. However, increased thermal curing durations, such as 48 and 72 hrs, did not further improve elongation. Essentially, no difference in Young's Modulus values occurred among the cured or uncured samples (Table 7). There were no associations between thermal curing durations and tensile strength or elongation (Table 8).

Texture profile analysis of firmness and springiness of polymer foams were compared with Instron physical measurements of compression molded dog-bones using the Pearson correlation test and were found to be significantly positive (Table 8). Texture analysis information could be employed for the preliminary evaluation of solid glycerol citrate polyester polymers to determine their suitability as potential plastics. Much time, labor and expense could be saved by dispensing with compression molding followed by Instron testing and substitution of texture analysis instead to derive a physical measurement of the glycerol citrate polyester polymers.

Conclusions

Solid glycerol citrate polyesters can readily be produced from citric acid with glycerol heated in a microwave for 60 s. This method of polyester polymer preparation is considerably more rapid than any other conventional chemical or heating method. Because of the unique physical architecture and their relative uniformity of these polyester polymer constructs (foams), texture analysis was found to be applicable to derive preliminary information as to their physical properties. High correlations were found comparing Instron physical tests (i.e., tensile strength, elongation) with texture analysis so that the texture analysis data can give preliminary information on the physical characteristics of glycerol citrate polyester polymers in a shorter time frame. The texture analysis technique can be employed on the sample 'as-is', requiring no grinding and time consuming compression molding.

Additional curing, accomplished through simple oven heating, was found to cause additional polymerization as evidenced by the changes in the polymer's physical properties (e.g., MC, HWL, OWL, color changes, springiness, firmness, tensile strength and elongation).

Example 3

The purpose of this Example was to determine the effect of various dicarboxylic acids as substitutes for and in combination with citric acid to produce the of the di- or tricarboxylic acid:glyceride polyester foams described above.

Di- or tricarboxylic acid:glyceride polyester foams were produced using oxalic acid, glutaric acid, malonic acid, adipic acid, succinic acid, pimelic acid, suberic acid, azelaic acid, sebacic acid, phthalic acid, isophthalic acid, and terephthalic acid either in place of citric acid or in combination with citric acid. The combinations and the relative amounts of the reactants, by weight, are set forth in Tables 9-11. The polyester foams were produced in the same manner as described in Example 1 and Tables 9A-E (microwave heating times in seconds as indicated), and then cured as described in Example 2 and in Tables 10A-E. Upon completion of curing, the foams were evaluated for appearance texture, weight loss, and size.

The results are shown in Tables 9 through 11.

Example 4

The purpose of this Example was to evaluate the di- or tricarboxylic acid:glyceride polyester foams produced from epoxidized soybean oils rather than glycerol. The foams were produced using adipic or citric acid, or combinations of the two.

Di- or tricarboxylic acid:glyceride polyester foams were produced using various combinations of adipic and/or citric acid reacted with either epoxidized corn, soybean or linseed oil. The combinations and the relative amounts of the reactants, by weight, and the microwave heating times (sec), are set forth in Tables 12A-C. The polyester foams were produced in the same manner as described in Example 1. The foams were evaluated for appearance texture, weight loss, and size.

The results are shown in Tables 12A-C and are summarized as follows:

Foam comprising 2 g adipic, 0.5 g citric, 9.5 g corn epoxy, 55 seconds. Weight in: 12.166 g, weight out: 11.166 g, temperature: 192.5° C., height: 23 mm. A cushion was created with uniform height. Many larger air bubbles are on the bottom of the cushion, with smaller ones forming on the top surface. The cushion is a light yellow outer ring with a darker, caramel colored middle due to slight burning in the center. It has a spongy feel and is non-sticky.

Foam comprising 2 g adipic, 0.5 g citric, 9.5 g soybean epoxy, 55 seconds. Weight in: 12.113 g, weight out: 11.125 g, temperature: 197.3° C., height: 28 mm. A cushion with a very slight sticky feel was made. There are air bubbles distributed without. The top of the cushion is smooth and uniform in color, a light yellow. It also looks more like a muffin with a rounded top. It feels squishy like a sponge. Deep in the center there is a slightly darker yellow color. This cushion has a softer feel than corn or linseed epoxy.

Foam comprising 2 g adipic, 0.5 g citric, 9.5 g linseed epoxy, 55 seconds. Weight in: 112.193 g, weight out: 9.876 g, temperature: 199.4° C., height: 34 mm. A large cushion was made with a yellow and brown color due to excessive burning in the middle and top (bottom in not burned). There are many medium sized air bubbles throughout. The cushion has an uneven top with one side dipping a little lower than the rest. It is not sticky and feels a little like a sponge but harder than with corn or soybean epoxy.

Foam comprising 2 g adipic, 0.5 g citric, 9.5 g soybean epoxy, 45 seconds. Weight in: 12.076 g, weight out: 11.591 g, temperature: 183.7° C., height: 19 mm. A small, even cushion was formed with a light yellow uniform color. The outside of the cushion is very sticky to the touch. However, it is soft (easily squished). The top is a flat, even terrain.

Foam comprising 2 g adipic, 0.5 g citric, 9.5 g soybean epoxy, 50 seconds. Weight in: 12.073 g, weight out: 11.458 g, temperature: 197.1° C., height: 27 mm. A soft, muffin like cushion was created. It is a sticky cushion with a slightly curved top with few air bubbles. The majority of the medium sized air bubbles are on the bottom and in the middle. It is a uniformly light yellow color.

Foam comprising 2 g adipic, 0.5 g citric, 9.5 g soybean epoxy, 60 seconds. Weight in: 12.028 g, weight out: 11.531 g, temperature: 210° C., height: 27 mm. A sticky cushion is formed with a light yellow color that turns to a medium yellow in the middle. It has a curved top and many air bubbles. It feels a little more dense than the soybean cushions cooked with less time but not as dense as if used with linseed epoxy.

Foam comprising 2 g adipic, 0.5 g citric, 9.5 g linseed epoxy, 40 seconds. Weight in: 12.116 g, weight out: 11.653 g, temperature: 182.9° C., height: 14 mm. A very dense cushion that is not easily squished is made from the mixture. It is a yellow color with a very slight burning yellow color on one half. The top is a little sticky and uneven. One side dips lower than the other.

Foam comprising 2 g adipic, 0.5 g citric, 9.5 g linseed epoxy, 45 seconds. Weight in: 12.144 g, weight out: 11.452 g, temperature: 192.7° C., height: 23 mm. This mixture makes a cushion that is very slightly sticky. It has a yellow color with a darker middle and a small dot of black from burning directly in the center. The top is uneven with one side higher than the other. The bottom of the cushion is very uniform with only very small air bubbles.

Foam comprising 3 g citric acid, 9 g corn epoxy, 45 seconds. Weight in: 12.280 g, weight out: 10.251 g, temperature: 223° C., height: 15 mm. An uneven cushion is formed with one side being taller, light yellow and softer with a few air bubbles. The opposite side is a darker yellow color, still quite soft and can be squished but it looks like there are less air bubbles on it and a little more shiny. This could be the beginning of the cushions being burned.

Foam comprising 3 g citric acid, 9 g soybean epoxy, 45 seconds. Weight in: 12.023 g, weight out: 10.680 g, temperature: 201° C., height: 8 mm. The product of the mixture is not a full cushion but more of a mat. The top is smooth with very, very tiny air bubbles that are fused together. When it comes out of the microwave, the top layer are like waves with parts going down then up. It looks yellow with an oily shine to it. The bottom layer is more like the other cushions, a bit fluffy (3-4 mm) with air bubbles, a lighter yellow appearance and squishy. Overall, the mat is firmer and dense.

Foam comprising 3 g citric acid, 9 g soybean epoxy, 50 seconds. Weight in: 12.144 g, weight out: 10.285 g, temperature: 195.3° C., height: 5 mm. A mat is formed with a similar top to the 50 second mixture. It is yellow with a shiny glow, comes out in waves and is not sticky and soft. However, the product does not really have two distinct layers. The bottom is very similar to the top with very, very small air bubbles and a slightly darker yellow color.

Foam comprising 3 g citric acid, 9 g soybean epoxy, 60 seconds. Weight in: 12.091 g, weight out: 9.967 g, temperature: 208° C., height: 5 mm. The cushion is very similar to the 50 second mat. It is yellow with very small air bubbles everywhere and a shiny coat. However, one side of the top is a little more dark and shiny than the rest.

Foam comprising 3 g citric acid, 9 g linseed epoxy, 45 seconds. Weight in: 12.161 g, weight out: 10.27 g, temperature: 205° C., height: 7 mm. A very uniform cushion mat formed with a dark yellow, light brown color and many small, popped air bubbles on top. The mat is kind of shiny and not sticky. The bottom is smooth, flat and a lighter color. The middle of the mat is somewhat squishy but not as much as the other two epoxies. The outer rim of the mat is very hard and crusty.

Foam comprising 3 g citric acid, 9 g linseed epoxy, 50 seconds. Weight in: 12.006 g, weight out: 10.901 g, temperature: 189.3° C., height: 6 mm. Similar to the mat with 45 seconds, but this mat has a little darker color. The edges of the mat curl up towards the center. It is not sticky but has an oily feel to the top. When taken out of the microwave, you can still see some of the epoxy bubbling, not reacted with anything, but that disappears into the cushion when cooled.

Foam comprising 3 g citric acid, 9 g linseed epoxy, 60 seconds. Weight in: 12.030 g, weight out: 9.524 g, temperature: 211° C., height: 5 mm. A crusty mat that looks like a wave in the middle and has the outer edges slightly curled up is formed from this mixture. The mat is dark yellow with a caramel colored side that looks oily (when taken out of the microwave, this is where you can see some of the epoxy still in liquid form bubbling but is sucked up by the cushion when cooled).

Foam comprising 1 g adipic, 2 g citric, 9 g corn epoxy, 45 seconds. Weight in: 12.039 g, weight out: 10.960 g, temperature: 203° C., height: 24 mm. A very soft cushion is formed. It has a light yellow color with a relatively smooth surface. Only a few air bubbles are on the top. The bottom has a lot more and a part that is medium yellow and sticky to touch. The cushion is very squishable but retains its form by bouncing back to its original shape. The top has a muffin shape with a slight dome appearance.

Foam comprising 1 g adipic, 2 g citric, 9 g soybean epoxy, 40 seconds. Weight in: 12.158 g, weight out: 10.602 g, temperature: 187.5° C., height: 8 mm. The cushion made is very flat and has a light and medium yellow appearance. Some of the top is lighter yellow and soft while other parts (namely the center) is a darker yellow with a shiny look that is a bit harder but still can be squished. It is slightly sticky especially around the edges and the bottom.

Foam comprising 1 g adipic, 2 g citric, 9 g soybean epoxy, 45 seconds. Weight in: 12.143 g, weight out: 10.867 g, temperature: 192.6° C., height: 9 mm. The product is a cushion with a yellow color and a smooth, flat top. It is not very sticky. The top layer has smaller air bubbles that have fused together while the bottom has much larger bubbles. It is relatively soft and can be squished, but springs back to form quickly compared to the soybean cushion.

Foam comprising 1 g adipic, 2 g citric, 9 g soybean epoxy, 55 seconds. Weight in: 12.146 g, weight out: 10.814 g, temperature: 209° C., height: 17 mm. The cushion has an uneven top. One side is very soft, squishy and light yellow. It is not sticky and is smooth due to small bubbles fused together. The other side of the top is not as high, is a little darker yellow and shiny. It is a bit sticky and the small air bubbles are visible. The bottom of the cushion is sticky, yellow and has large air bubbles.

Foam comprising 1 g adipic, 2 g citric, 9 g soybean epoxy, 65 seconds. Weight in: 12.034 g, weight out: 10.068 g, temperature: 213° C., height: 11 mm. The cushion made is short but very soft and squishy. It is uneven on the top, some areas taller than others. The smaller areas are dark yellow, shiny and a bit sticky. The higher elevated areas are yellow and are not as sticky. There are air bubbles throughout the cushion. In the center of the bottom there is a quarter sized area that is dark yellow, very sticky and oily.

Foam comprising 1 g adipic, 2 g citric, 9 g linseed epoxy, 40 seconds. Weight in: 12.036 g, weight out: 11.114 g, temperature: 189.0° C., height: 4 mm. The cushion is really only cushion-like on one half. One half of it is very dense, does not indent, has many air bubbles and is a little sticky, but is still fluffier like a cushion. The other half is very flat and mat-like. It is also a bit sticky, harder and does not indent. Both sides are medium to dark yellow. The top is a wave-like design.

Foam comprising 1 g adipic, 2 g citric, 9 g linseed epoxy, 45 seconds. Weight in: 12.033 g, weight out: 9.839 g, temperature: 193.5° C., height: 10 mm. A flat cushion that is even on top and bottom was formed. The center is dark brown and burned. It is not sticky, can be pushed down a little but is more dense than soybean and corn epoxy cushions. The air bubbles are small.

Foam comprising 1 g adipic, 2 g citric, 9 g linseed epoxy, 50 seconds. Weight in: 12.084 g, weight out: 10.257 g, temperature: 207° C., height: 5 mm. A mat is formed. It is wave like on the top with an area that indents a little having a caramel, shiny appearance with the appearance of little popped air bubbles on it. The higher elevated areas are more cushion like, can be pushed in a little and have air bubbles, but they are a darker yellow color and not sticky. The bottom shows signs of burning.

Example 5

The purpose of this Example was to evaluate di- or tricarboxylic acid:glycerol/sorbitol polyester foams containing fatty acid or silicone additives. The foams were produced using adipic or citric acid, or combinations of the two, with fatty acids and glycerol/sorbitol ingredients.

Di- or tricarboxylic acid:glyceride polyester foams were produced using adipic acid either in place of citric acid or in combination with fatty acids and glycerol/sorbitol. Additives which were added included the fatty acids lauric acid or stearic acid, or silicone. The combinations and the relative amounts of the reactants, by weight, are set forth in Tables 13A-D and 14. The polyester foams were produced in the same manner as described in Example 1. The foams were evaluated for appearance texture, weight loss, and size.

The results are shown in Tables 13 and 14.

It is understood that the foregoing detailed description is given merely by way of illustration and that modifications and variations may be made therein without departing from the spirit and scope of the invention.

TABLE 1

Responses of Citric Acid:Glycerol Molar Ratio Blends to Different Heating Treatments.

| Citric Acid: Glycerol | Heating (sec) | Weight Final (%) | Temperature (° C.) | Height (mm) | Description |
|---|---|---|---|---|---|
| Microwave: | | | | | |
| 2:1 | 60 | 52.4% | 212 | 52 | Foam |
| 1.4:1 | 60 | 55.6% | 213 | 43 | Foam |

TABLE 1-continued

Responses of Citric Acid:Glycerol Molar Ratio Blends to Different Heating Treatments.

| Citric Acid: Glycerol | Heating (sec) | Weight Final (%) | Temperature (°C.) | Height (mm) | Description |
|---|---|---|---|---|---|
| 1:1 | 60 | 58.2% | 211 | 32 | Foam |
| 0.7:1 | 60 | 57.7% | 208 | 27 | Foam |
| 0.5:1 | 60 | 59.8% | 208 | 18 | Foam |
| 0.34:1 | 60 | 60.5% | 212 | 7 | Gel |
| 0.24:1 | 60 | 64.2% | 209 | 4 | Liquid |
| 0.16:1 | 60 | 68.9% | 213 | 3 | Liquid |
| 0.12:1 | 60 | 72.2% | 217 | 3 | Liquid |
| Oven at 100° C.: | | | | | |
| 2:1 | 432,000 | 95.9% | 100 | 3 | Gel |
| 1.4:1 | 432,000 | 93.7% | 100 | 3 | Gel |
| 1:1 | 432,000 | 93.0% | 100 | 3 | Gel |
| 0.7:1 | 432,000 | 89.2% | 100 | 3 | Sticky gel |
| 0.5:1 | 432,000 | 86.1% | 100 | 3 | Sticky gel |
| 0.34:1 | 432,000 | 86.5% | 100 | 3 | Sticky gel |
| 0.24:1 | 432,000 | 80.9% | 100 | 3 | Sticky gel |
| 0.16:1 | 432,000 | 88.9% | 100 | 3 | Sticky liquid |
| 0.12:1 | 432,000 | 60.1% | 100 | 3 | Liquid |
| Autoclave: | | | | | |
| 2:1 | 2,700 | 101.6% | 121 | 3 | Sticky gel |
| 1.4:1 | 2,700 | 101.5% | 121 | 3 | Sticky gel |
| 1:1 | 2,700 | 101.1% | 121 | 3 | Sticky gel |
| 0.7:1 | 2,700 | 100.4% | 121 | 3 | Sticky gel |
| 0.5:1 | 2,700 | 101.3% | 121 | 3 | Liquid |
| 0.34:1 | 2,700 | 101.1% | 121 | 3 | Liquid |
| 0.24:1 | 2,700 | 101.3% | 121 | 3 | Liquid |
| 0.16:1 | 2,700 | 102.3% | 121 | 3 | Liquid |
| 0.12:1 | 2,700 | 100.0% | 121 | 3 | Liquid |
| Hotplate: | | | | | |
| 2:1 | 368 | 87.4% | 224 | 9 | Foam |
| 1.4:1 | 307 | 84.5% | 215 | 12 | Foam |
| 1:1 | 307 | 81.8% | 224 | 11 | Foam |
| 0.7:1 | 383 | 83.1% | 240 | 10 | Foam |
| 0.5:1 | 359 | 72.3% | 236 | 8 | Foam |
| 0.34:1 | 379 | 77.0% | 242 | 4 | Sticky gel |
| 0.24:1 | 413 | 72.2% | 231 | 3 | Liquid |
| 0.16:1 | 430 | 76.9% | 224 | 3 | Liquid |
| 0.12:1 | 428 | 77.6% | 228 | 3 | Liquid |

TABLE 2

Degradative Responses of Glycerol Citrate Polyesters Prepared From Various Citric Acid:Glycerol Molar Ratio Blends to Acid and Base Concentrations after 72 hrs.*

| Citric Acid:Glycerol | HCl | | | | NaOH | | |
|---|---|---|---|---|---|---|---|
|  | 0 | 0.1 | 0.5 | 1 | 0.1 | 0.5 | 1 |
| 2:1 | 43.6a | 49.6a | 64.0b | 70.5c | 81.6d | 94.0e | 94.7e |
| 1.4:1 | 8.0a | 8.9a | 6.0a | 44.0b | 29.7c | 96.9d | 97.6d |
| 1:1 | 4.5a | 4.3a | 12.3b | 8.1b | 38.8c | 95.5d | 90.2d |
| 0.7:1 | 7.6a | 9.8a | 12.5b | 10.2b | 59.4c | 95.5d | 88.5d |
| 0.5:1 | 5.0a | 20.8b | 28.5c | 17.4b | 63.5d | 94.6d | 92.1e |

*Percent degradation of the original materials is reported. Three different replicates are presented for each mean. Values with different letters in the same row were significant at $P \leq 0.05$.

TABLE 3

Physical and Texture Properties of Glycerol Citrate Polyester Polymer Exposed to Various Curing Times at 100° C. Curing Time and Oven Polymer Weight Loss (OWL) (%), Moisture Content (MC) (%) and Hydrated-Polymer Weight Loss (HWL) (%), Springiness (%), and Firmness (Kg) Means and S.E. Values Are Presented.

| Curing (hr) | Springiness (%) | Firmness (Kg) | HWL (%) | OWL (%) | MC (%) |
|---|---|---|---|---|---|
| 0 | 27.9 ± 0.8a | 5.9 ± 0.5a | 8.3 ± 1.6a | 0.0 ± 0.0a | 5.7 ± 0.2a |
| 6 | 55.4 ± 1.6b | 11.9 ± 0.8b | 4.9 ± 0.77ab | 1.2 ± 0.2b | 5.5 ± 0.1a |
| 24 | 66.9 ± 1.8c | 13.7 ± 1.3b | 2.3 ± 0.8b | 2.4 ± 0.1c | 4.6 ± 0.3b |
| 48 | 67.8 ± 1.5c | 17.7 ± 1.6b | 1.9 ± 1.0b | 3.0 ± 0.5c | 4.7 ± 0.2b |
| 72 | 56.8 ± 2.0b | 11.5 ± 2. b | 1.4 ± 0.5b | 2.3 ± 0.1c | 3.7 ± 0.7c | a Values with different letters in the same row were significant at $P \leq 0.05$. Three different replicates are presented for each mean.

TABLE 4

Pearson Correlation Coefficients Values for Physical Values and Cure Time.[a]

|  | Curing (hr) | Springiness (%) | Firmness (Kg) | HWL (%) | OWL (%) |
|---|---|---|---|---|---|
| Oven Curing (hr) | — | 0.475 | 0.392 | −0.725* | 0.639* |
| Springiness (%) | 0.475 | — | 0.928* | −0.857* | 0.929* |
| Firmness (Kg) | 0.392 | 0.928* | — | −0.693* | 0.924* |
| HWL (%) | −0.725* | −0.857* | −0.693* | — | −0.771* |
| OWL (%) | 0.639* | 0.929* | 0.924* | −0.771* | — |
| MC (%) | −0.904* | −0.566* | −0.424 | 0.694* | −0.728* |

[a] Values with asterisk were significant at $P \leq 0.05$.

TABLE 5

Results of Instrumental Color Determination of Thermal Cured Glycerol:Citrate Polyester Foams. Measured Color Values (L*, a* and b*) and Calculated (C* and H*) Means and S.E. Values are Presented.

| Para-meter | Cure Time (hr) | | | | |
| --- | --- | --- | --- | --- | --- |
|  | 0 | 6 | 24 | 48 | 72 |
| L* | 71.6 ± 0.6a | 69.0 ± 0.4a | 66.3 ± 3.3a | 68.3 ± 0.3a | 63.3 ± 3.5a |
| a* | −4.5 ± 0.2a | −4.6 ± 0.1a | −4.9 ± 0.5a | −4.9 ± 0.4a | −4.7 ± 0.1a |
| b* | 8.09 ± 0.6a | 9.8 ± 0.1a | 14.2 ± 1.8a | 21.8 ± 4.1b | 17.1 ± 1.8b |
| $C^*_{ab}$ | 9.3 ± 0.6a | 10.8 ± 0.1a | 15.0 ± 1.9a | 22.3 ± 3.9b | 22.4 ± 3.9b |
| $H^*_{ab}$ | −1.06 ± 0.1a | 1.1 ± 0.1a | −1.2 ± 0.1b | −1.3 ± 0.1b | −1.3 ± 0.1b | a Values with different letters in the same row were significant at $P \leq 0.05$. Nine observations were administered per cure time.

TABLE 6

Pearson Correlation Coefficients Values for Color Values and Cure Times, Physical Properties and Texture Properties[a].

|  | L* | a* | B* | $C^*_{ab}$ | $H^*_{ab}$ |
| --- | --- | --- | --- | --- | --- |
| Cure time (hr) | 0.996* | 0.985* | 0.935* | 0.774* | 0.547* |
| L* | — | 0.996* | 0.962* | 0.824* | 0.614* |
| a* | 0.996* | — | 0.981* | 0.869* | 0.676* |
| b* | 0.962* | 0.981* | — | 0.947* | 0.803* |
| $C^*_{ab}$ | 0.824* | 0.869* | 0.947* | — | 0.945* |
| $H^*_{ab}$ | 0.614* | 0.676* | 0.803* | 0.945* | — |
| MC (%) | 0.812* | −0.071 | −0.695* | −0.837* | −0.020 |

TABLE 6-continued

Pearson Correlation Coefficients Values for Color Values and Cure Times, Physical Properties and Texture Properties[a].

|  | L* | a* | B* | $C^*_{ab}$ | $H^*_{ab}$ |
| --- | --- | --- | --- | --- | --- |
| OWL (%) | −0.564* | 0.470 | 0.834* | 0.763* | 0.436 |
| HWL (%) | 0.812* | −0.299 | −0.729* | −0.750* | −0.255 |
| Springi-ness (%) | −0.539* | 0.379 | 0.702* | 0.602* | 0.346 |
| Firmness (Kg) | −0.284 | 0.615* | 0.750* | −0.746* | 0.112 |

[a]Values with asterisk were significant at $P \leq 0.05$. Nine color observations were recorded per cure time.

TABLE 7

Effect of Curing Times on Mechanical Properties of Glycerol Citrate Polyesters.

| Cure (hr) | Moisture (%) | Tensile Strength (MPa) | Elongation (%) | Young's Modules (MPa) |
| --- | --- | --- | --- | --- |
| 0 | 3.11 | 13.2 ± 2.5a | 3.5 ± 0.6a | 485.5 ± 64.6a |
| 6 | 2.75 | 34.6 ± 1.5b | 3.5 ± 0.3a | 526.7 ± 18.5a |
| 24 | 2.55 | 39.1 ± 6.3b | 7.1 ± 1.0b | 570.1 ± 18.9a |
| 48 | 2.52 | 33.6 ± 8.5b | 7.1 ± 1.0b | 562.6 ± 63.9a |
| 72 | 2.51 | 30.6 ± 1.0b | 8.5 ± 1.2b | 455.4 ± 16.2a | a Values with different letters in the same row were significant at $P \leq 0.05$. Means and S.E. are shown. Four different replicates are presented for each mean.

TABLE 8

Pearson Correlation Coefficients Values for Physical Properties Values and Cure Time[a].

|  | Cure (hr) | Tensile Strength (MPa) | Elongation (%) | Young's Mondules (MPa) | Springiness (%) |
| --- | --- | --- | --- | --- | --- |
| Cure (hr) | — | 0.354 | 0.496 | 0.036 | 0.536* |
| TS (MPa) | 0.354 | — | 0.915* | 0.768* | 0.949* |
| Elo (%) | 0.496 | 0.915* | — | 0.492 | 0.858* |
| YM (Mpa) | 0.036 | 0.768* | 0.492 | — | 0.616* |
| Springiness (%) | 0.536* | 0.949* | 0.858* | 0.807* | — |
| Firmness (Kg) | 0.499 | 0.805* | 0.723* | 0.825* | 0.934* |

[a]Values with asterisk were significant at $P \leq 0.05$.

TABLE 9A

Influence of Succinic Acid Blended with Citric Acid and Glycerol and Microwaved.

| Succinic Acid (g) | Citric Acid (g) | Glycerol (g) | Weight Loss (%) | Heating Time (s) | Final Temperature (°C.) | Height (mm) | Width (mm) | Remarks |
| --- | --- | --- | --- | --- | --- | --- | --- | --- |
| 9 | 0 | 3 | 41.4 | 320 | 206 | 43.15 | 49.67 | Brown, squishy |
| 8 | 0 | 4 | 32.5 | 320 | 202 | 34.31 | 48.46 | Squishy, firm |
| 7 | 0 | 5 | 24.7 | 280 | 200 | 44.56 | 53.12 | Firm, squishy |
| 6 | 0 | 6 | 32.2 | 330 | 204 | 28.91 | 49.01 | Squishy, small foam |
| 6 | 1 | 5 | 35.4 | 360 | 209 | 17.13 | 50.44 | More firm and not sticky |
| 6 | 2 | 4 | 28.4 | 330 | 206 | 48.91 | 52.11 | Very firm, squishy |
| 5 | 3 | 4 | 32.4 | 240 | 203 | 41.46 | 54.47 | Firm, white foam |
| 4 | 4 | 4 | 32.4 | 240 | 204 | 48.1 | 56.82 | White, firm |

TABLE 9B

Influence of Adipic Acid Blended with Citric Acid and Glycerol and Microwaved.

| Adipic Acid (g) | Citric Acid (g) | Glycerol (g) | Weight Loss (%) | Heating Time (s) | Final Temperature (°C.) | Height (mm) | Width (mm) | Remarks |
|---|---|---|---|---|---|---|---|---|
| 9 | 0 | 3 | 22.2 | 340 | 203 | 36.54 | 54.312 | White foam, soft, squishy |
| 8 | 0 | 4 | 20.3 | 360 | 201 | 28.59 | 54.08 | Cushion, squishy, more firm |
| 7 | 0 | 5 | 24.9 | 480 | 205 | 29.4 | 50.89 | Sticky foam, yellow |
| 6 | 0 | 6 | 32.3 | 480 | 209 | 19.95 | 48.66 | Small, yellow, firm |
| 6 | 1 | 5 | 32.1 | 180 | 198.6 | 36.31 | 50.65 | Medium foam, springy |
| 6 | 2 | 4 | 26.4 | 210 | 200 | 43.01 | 55.2 | Medium, harder foam |
| 5 | 3 | 4 | 26.3 | 240 | 208 | 47.21 | 53.6 | Cushy, firm, white |
| 4 | 4 | 4 | 27.4 | 2140 | 204 | 49.42 | 53.07 | Firm foam, white |

TABLE 9C

Influence of Suberic Acid Blended with Citric Acid and Glycerol and Microwaved.

| Suberic Acid (g) | Citric Acid (g) | Glycerol (g) | Weight Loss (%) | Heating Time (s) | Final Temperature (°C.) | Height (mm) | Width (mm) | Remarks |
|---|---|---|---|---|---|---|---|---|
| 9 | 0 | 3 | 22.3 | 300 | 204 | 35.95 | 52.48 | Squishy foam, sticky |
| 8 | 0 | 4 | 20.5 | 330 | 203 | 34.29 | 51.09 | White, firm, sticky |
| 7 | 0 | 5 | 26.8 | 390 | 201 | 25.01 | 50.77 | Small, yellow, sticky |
| 6 | 0 | 6 | 36.8 | 330 | 204 | 19.89 | 45.79 | Small, springy but firm |
| 6 | 1 | 5 | 26.5 | 300 | 197.5 | 33.64 | 51.93 | Medium foam, springy |
| 6 | 2 | 4 | 27.4 | 300 | 200 | 45.05 | 54.91 | Medium, white, hard |
| 5 | 3 | 4 | 33.1 | 240 | 203 | 43.05 | 54.6 | White, firm, foam |
| 4 | 4 | 4 | 33.9 | 240 | 209 | 44.3 | 53.16 | Squishy, white foam |

TABLE 9D

Influence of Azelaic Acid Blended with Citric Acid and Glycerol and Microwaved.

| Azelaic Acid (g) | Citric Acid (g) | Glycerol (g) | Weight Loss (%) | Heating Time (s) | Final Temperature (°C.) | Height (mm) | Width (mm) | Remarks |
|---|---|---|---|---|---|---|---|---|
| 9 | 0 | 3 | 23.5 | 360 | 204 | 36 | 49.44 | White, small, sticky sides |
| 8 | 0 | 4 | 20.8 | 390 | 202 | 33.52 | 50.36 | White, small, sticky |
| 7 | 0 | 5 | 29.1 | 420 | 207 | 33.49 | 50.01 | Small, somewhat sticky |
| 6 | 0 | 6 | 30.2 | 600 | 213 | 10.36 | 47.11 | Small, yellow |
| 6 | 1 | 5 | 30.4 | 540 | 209 | 32.64 | 52.21 | Squishy, a little sticky |
| 6 | 2 | 4 | 29.4 | 360 | 201 | 45.75 | 54.96 | Cushion, medium |
| 5 | 3 | 4 | 22.9 | 240 | 204 | 42.17 | 50.83 | Squishy foam, white, firm |
| 4 | 4 | 4 | 28.3 | 240 | 201 | 47.33 | 55.13 | Cushion, white, firm |

TABLE 9E

Influence of Sebacic Acid Blended with Citric Acid and Glycerol and Microwaved.

| Sebacic Acid (g) | Citric Acid (g) | Glycerol (g) | Weight Loss (%) | Heating Time (s) | Final Temperature (°C.) | Height (mm) | Width (mm) | Remarks |
|---|---|---|---|---|---|---|---|---|
| 9 | 0 | 3 | 24.8 | 360 | 204 | 35.61 | 54.5 | Sticky, yellow, squishy |
| 8 | 0 | 4 | 26.6 | 360 | 201 | 22.56 | 47.21 | Small, sticky, yellow |
| 7 | 0 | 5 | 27.0 | 390 | 202 | 17.66 | 47.07 | Small, white, sticky |
| 6 | 0 | 6 | 33.1 | 720 | 232 | 7.12 | 45.36 | Small, yellow, sticky goo |
| 6 | 1 | 5 | 33.8 | 300 | 201 | 27.24 | 52.03 | Firm cushion, not sticky |
| 6 | 2 | 4 | 30.0 | 240 | 208 | 45.31 | 57.1 | Squishy, firm, white |
| 5 | 3 | 4 | 23.7 | 240 | 210 | 41.46 | 54.35 | Smaller, white, firm |
| 4 | 4 | 4 | 26.2 | 240 | 203 | 44.66 | 52.28 | Squishy, firm, not sticky |

TABLE 10A

Influence of 24 Hour Oven Curing on the Succinic Acid:Citric Acid:Glycerol Polyester Blends on Their Weight Losses.

| Succinic Acid (g) | Citric Acid (g) | Glycerol (g) | Weight Loss (%) |
|---|---|---|---|
| 9 | 0 | 3 | 2.5 |
| 8 | 0 | 4 | 3.5 |
| 7 | 0 | 5 | 4.3 |
| 6 | 0 | 6 | 5.7 |
| 6 | 1 | 5 | 7.4 |
| 6 | 2 | 4 | 3.5 |
| 5 | 3 | 4 | 4.3 |
| 4 | 4 | 4 | 4.4 |

TABLE 10B

Influence of 24 Hour Oven Curing on the Adipic Acid:Citric Acid:Glycerol Polyester Blends on Their Weight Losses.

| Adipic Acid (g) | Citric Acid (g) | Glycerol (g) | Weight Loss (%) |
|---|---|---|---|
| 9 | 0 | 3 | 3.7 |
| 8 | 0 | 4 | 2.9 |
| 7 | 0 | 5 | 4.5 |
| 6 | 0 | 6 | 4.3 |
| 6 | 1 | 5 | 3.8 |
| 6 | 2 | 4 | 5.7 |
| 5 | 3 | 4 | 6.3 |
| 4 | 4 | 4 | 4.6 |

TABLE 10C

Influence of 24 Hour Oven Curing on the Suberic Acid:Citric Acid:Glycerol Polyester Blends on Their Weight Losses.

| Suberic Acid (g) | Citric Acid (g) | Glycerol (g) | Weight Loss % |
|---|---|---|---|
| 9 | 0 | 3 | 1.8 |
| 8 | 0 | 4 | 2.0 |
| 7 | 0 | 5 | 4.3 |
| 6 | 0 | 6 | 5.6 |
| 6 | 1 | 5 | 6.1 |
| 6 | 2 | 4 | 4.6 |
| 5 | 3 | 4 | 2.6 |
| 4 | 4 | 4 | 2.7 |

TABLE 10D

Influence of 24 Hour Oven Curing on the Azelaic Acid:Citric Acid:Glycerol Polyester Blends on Their Weight Losses.

| Azelaic Acid (g) | Citric Acid (g) | Glycerol (g) | Weight Loss (%) |
|---|---|---|---|
| 9 | 0 | 3 | 1.5 |
| 8 | 0 | 4 | 2.3 |
| 7 | 0 | 5 | 4.2 |
| 6 | 0 | 6 | 8.4 |
| 6 | 1 | 5 | 5.8 |
| 6 | 2 | 4 | 4.8 |
| 5 | 3 | 4 | 4.3 |
| 4 | 4 | 4 | 4.0 |

TABLE 10E

Influence of 24 Hour Oven Curing on the Sebacic Acid:Citric Acid:Glycerol Polyester Blends on Their Weight Losses.

| Sebacic Acid (g) | Citric Acid (g) | Glycerol (g) | Weight Loss (%) |
|---|---|---|---|
| 9 | 0 | 3 | 1.3 |
| 8 | 0 | 4 | 3.3 |
| 7 | 0 | 5 | 3.2 |
| 6 | 0 | 6 | 3.6 |
| 6 | 1 | 5 | 2.9 |
| 6 | 2 | 4 | 4.0 |
| 5 | 3 | 4 | 4.4 |
| 4 | 4 | 4 | 4.4 |

TABLE 11A

Microwave Responses from Mixtures of 2 g Glycerol, 5 g Citric Acid and 5 g Dicarboxylic Acid (DA).

| DA (5 g) | Time (s) | Weight Original (g) | Weight Final (g) | % Weight Loss |
|---|---|---|---|---|
| succinic | 80 | 12.026 | 4.646 | 61.4 |
| oxalic | 80 | 12.036 | 1.607 | 86.6 |
| isophthalic | 65 | 12.021 | 8.189 | 31.9 |
| suberic | 65 | 12.124 | 7.396 | 39.0 |
| terephthalic | 70 | 12.011 | 9.147 | 23.8 |
| phthalic | 70 | 12.047 | 4.295 | 64.3 |
| glutaric | 65 | 12.013 | 6.207 | 48.3 |
| parrafin | 65 | 12.085 | 10.8 | 10.6 |
| succinic | 75 | 12.094 | 6.141 | 49.2 |
| oxalic | 65 | 12.075 | 2.352 | 80.5 |
| oxalic | 60 | 12.125 | 2.757 | 77.3 |
| sebacic | 65 | 12 | 6.918 | 42.4 |
| azelaic | 65 | 12.038 | 7.078 | 41.2 |
| malonic | 65 | 12.095 | 2.546 | 78.9 |
| malonic | 55 | 12.061 | 3.676 | 69.5 |

TABLE 11B

Microwave Responses from Mixtures of Various Amounts of Glycerol (G), Citric Acid (CA) and Succinic Acid (SA).

| SA (g) | CA (g) | G (g) | Time (s) | Weight Original (g) | Weight Final (g) | % Weight Loss | Final Temperature (°C.) |
|---|---|---|---|---|---|---|---|
| 6 | 4 | 2 | 70 | 12.034 | 6.177 | 48.7 | 206 |
| 5 | 5 | 2 | 65 | 12.107 | 6.445 | 46.8 | 207 |
| 4 | 6 | 2 | 55 | 12.158 | 6.283 | 48.3 | 188.7 |
| 3 | 7 | 2 | 55 | 12.032 | 5.626 | 53.2 | 190.2 |
| 2 | 6 | 4 | 55 | 12.268 | 8.137 | 33.7 | 210 |
| 2 | 5 | 5 | 60 | 12.11 | 7.21 | 40.5 | 206 |
| 3 | 6 | 3 | 55 | 12.157 | 7.689 | 36.8 | 211 |
| 3 | 5 | 4 | 55 | 12.051 | 7.2849 | 39.5 | 204 |

TABLE 11C

Response of Succinic Acid (SA), Adipic Acid (AA), Citric Acid (CA) and Glycerol (G) to Microwave Heating.

| SA (g) | AA (g) | CA (g) | G (g) | Weight Loss (%) | Final Temperature (°C.) | Time (s) |
|---|---|---|---|---|---|---|
| 4 | 1 | 5 | 2 | 50.2 | 211 | 70 |
| 3 | 1 | 5 | 2 | 51.9 | 200 | 68 |
| 2.5 | 2.5 | 5 | 2 | 47 | 214 | 68 |
| 1 | 4 | 5 | 2 | 43.8 | 210 | 68 |

TABLE 11D

Response of Oxalic Acid (OA), Adipic Acid (AA), Citric Acid (CA) and Glycerol (G) to Microwave Heating.

| OA (g) | AA (g) | CA (g) | G (g) | Weight Loss (%) | Final Temperature (° C.) | Time (s) |
|---|---|---|---|---|---|---|
| 4 | 1 | 5 | 2 | 70.7 | 191.7 | 65 |
| 3 | 1 | 5 | 2 | 65.1 | 202 | 65 |
| 2.5 | 2.5 | 5 | 2 | 58.5 | 207 | 65 |
| 1 | 4 | 5 | 2 | 46.7 | 204 | 65 |

TABLE 11E

Response of Suberic Acid (SA), Adipic Acid (AA), Citric Acid (CA) and Glycerol (G) to Microwave Heating.

| SA (g) | AA (g) | CA (g) | G (g) | Weight Loss (%) | Final Temperature (° C.) | Time (s) |
|---|---|---|---|---|---|---|
| 4 | 1 | 5 | 2 | 46.3 | 208 | 65 |
| 3 | 1 | 5 | 2 | 51.9 | 211 | 65 |
| 2.5 | 2.5 | 5 | 2 | 40.7 | 208 | 65 |
| 1 | 4 | 5 | 2 | 43.1 | 204 | 65 |

TABLE 12A

Microwave Responses from Mixtures of Various Amounts of Adipic Acid (AA), Citric Acid (CA) and Epoxized Corn Oil (ECO).

| AA (%) | CA (%) | ECO (%) | Time (s) | Weight Loss % | Height (mm) | Final Temperature (° C.) | Remarks |
|---|---|---|---|---|---|---|---|
| 16.7 | 4.2 | 79.2 | 12 | 16.67 | 4.17 | 192.5 | Cushion, squishy, light |
| 0.0 | 25.0 | 75.0 | 45 | 16.5 | 15 | 223 | Cushion, uneven, soft, burned |
| 8.3 | 16.7 | 75.0 | 45 | 9.0 | 24 | 203 | Cushion, soft, light, sticky |

TABLE 12B

Microwave Responses from Mixtures of Various Amounts of Adipic Acid (AA), Citric Acid (CA) and Epoxized Corn Oil (ECO).

| AA (%) | CA (%) | ESO (%) | Time (s) | Weight Loss % | Height (mm) | Final Temperature (° C.) | Remarks |
|---|---|---|---|---|---|---|---|
| 16.7 | 4.2 | 79.2 | 55 | 8.2 | 28 | 197.3 | Cushion, bit sticky, light yellow |
| 16.7 | 4.2 | 79.2 | 45 | 4.0 | 19 | 183.7 | Small, cushion, light, sticky |
| 16.7 | 4.2 | 79.2 | 50 | 5.1 | 27 | 197.1 | Muffin cushion, sticky, light |
| 16.7 | 4.2 | 79.2 | 60 | 4.1 | 27 | 210 | Sticky cushion, denser |
| 0.0 | 25.0 | 75.0 | 45 | 11.2 | 8 | 201 | Mat like, shiny, oily |
| 0.0 | 25.0 | 75.0 | 50 | 15.3 | 5 | 195.3 | Mat like, uniform |
| 0.0 | 25.0 | 75.0 | 60 | 17.6 | 5 | 208 | Mat like, darker yellow |
| 8.3 | 16.7 | 75.0 | 40 | 17.2 | 8 | 187.5 | Flat mat, oily, soft center |
| 8.3 | 16.7 | 75.0 | 45 | 10.5 | 9 | 192.6 | Cushion, flat, soft |
| 8.3 | 16.7 | 75.0 | 55 | 11.0 | 17 | 209 | Cushion, uneven, shiny, sticky |
| 8.3 | 16.7 | 75.0 | 65 | 16.3 | 11 | 213 | Cushion, sticky, dark yellow |

TABLE 12C

Microwave Responses from Mixtures of Various Amounts of Adipic Acid (AA), Citric Acid (CA) and Epoxized Linseed Oils (ELO).

| AA (%) | CA (%) | ELO (%) | Time (s) | Weight Loss % | Height (mm) | Final Temperature (° C.) | Remarks |
|---|---|---|---|---|---|---|---|
| 16.7 | 4.2 | 79.2 | 55 | 19.0 | 34 | 199.4 | Large cushion, burned, uneven |
| 16.7 | 4.2 | 79.2 | 40 | 3.8 | 14 | 182.9 | Dense cushion, yellow, sticky |
| 16.7 | 4.2 | 79.2 | 45 | 5.7 | 23 | 192.7 | Sticky cushion, yellow, burned |
| 0.0 | 25.0 | 75.0 | 45 | 15.5 | 7 | 205 | Mat, waved top, light, oily |
| 0.0 | 25.0 | 75.0 | 50 | 9.2 | 6 | 189.3 | Mat, darker color, edges curl |
| 0.0 | 25.0 | 75.0 | 60 | 20.8 | 5 | 211 | Mat, dark, curled edge, crusty |
| 8.3 | 16.7 | 75.0 | 40 | 7.7 | 4 | 189 | Half cushion, dense, bit sticky |
| 8.3 | 16.7 | 75.0 | 45 | 18.2 | 10 | 193.5 | Flat cushion, burned, dense |
| 8.3 | 16.7 | 75.0 | 50 | 15.1 | 5 | 207 | Mat, caramel, oily |

TABLE 13A

Responses of Adipic Acid, Lauric Acid, Citric Acid and Glycerol Mixtures to Microwave Heating.

| Adipic Acid (g) | Lauric Acid (g) | Citric Acid (g) | Glycerol (g) | Time (sec) | Final Temperature (° C.) | Height (mm) | Width (mm) | Remarks |
|---|---|---|---|---|---|---|---|---|
| 0 | 0 | 8 | 4 | 90 | 199.3 | 67.63 | 65.41 | Yellow hard foam |
| 0 | 0.25 | 8 | 4 | 120 | 201 | 70.13 | 65.37 | Large, white, hard foam |
| 0 | 0.5 | 8 | 4 | 120 | 201 | 63.57 | 66 | Firm foam |
| 0 | 0.75 | 0 | 6 | 180 | 190.3 | | | Liquid |
| 1 | 0.5 | 7 | 4 | 150 | 204 | 53.8 | 59.17 | White, hard foam |
| 2 | 0.5 | 6 | 4 | 180 | 200 | 52.31 | 56.44 | White, hard foam |
| 3 | 0.5 | 5 | 4 | 180 | 203 | 47.15 | 53.13 | White foam, hard |
| 1 | 0.25 | 7 | 4 | 160 | 200 | 60.88 | 64.92 | White foam |

TABLE 13B

Responses of Adipic Acid, Lauric Acid, Citric Acid and Glycerol Mixtures to Microwave Heating.

| Adipic Acid (g) | Lauric Acid (g) | Citric Acid (g) | Glycerol (g) | Weight Loss (%) | Heating Time (s) | Final Temperature (° C.) | Height (mm) | Width (mm) | Remarks |
|---|---|---|---|---|---|---|---|---|---|
| 0 | 0 | 8 | 4 | 68.8 | 90 | 201 | 50.8 | 60.5 | Firm foam |
| 0 | 4 | 8 | 0 | 9.3 | 240 | 209 | | | Liquid |
| 0 | 3 | 8 | 1 | 28.0 | 180 | 201 | 44.8 | 57.8 | Brown foam, hard |
| 0 | 2 | 8 | 2 | 50.0 | 180 | 203 | 56.8 | 63.0 | Foam, hard, brittle |
| 0 | 1 | 8 | 3 | 64.1 | 150 | 197.4 | 52.5 | 74.7 | Brittle, wide foam |
| 1 | 1 | 8 | 2 | 63.3 | 150 | 199.6 | 59.1 | 68.1 | Large, firm |
| 2 | 1 | 8 | 2 | 58.9 | 150 | 197.3 | 57.0 | 65.8 | Very large, white, sticky a bit |

TABLE 13C

Response of Adipic Acid (AA), Stearic Acid (SA), Citric Acid (CA) and Glycerol (G) Mixtures to Microwave Heating.

| AA (g) | SA (g) | CA (g) | G (g) | Weight Remaining (%) | Time (S) | Final Temperature (° C.) | Height (mm) | Width (mm) | Remarks |
|---|---|---|---|---|---|---|---|---|---|
| 0 | 3 | 8 | 1 | 31.5 | 180 | 208 | 36.14 | 52.79 | Small, brittle |
| 0 | 2 | 8 | 2 | 57.0 | 180 | 206 | 46.71 | 71.36 | Foam, hard, brittle |
| 0 | 1 | 8 | 3 | 62.3 | 180 | 201 | 46.75 | 69.44 | Foam, hard, white |
| 1 | 1 | 8 | 2 | 67.0 | 150 | 198.1 | 41.68 | 62.3 | Large foam, brittle |
| 2 | 1 | 8 | 2 | 64.2 | 150 | 195.4 | 45.81 | 60.41 | Foam, hard |

TABLE 13D

Response of Adipic Acid (AA), Stearic Acid (SA), Citric Acid (CA) and Sorbitol (S) Mixtures to Microwave Heating.

| AA (g) | SA (g) | CA (g) | S (g) | Weight Remaining (%) | Time (S) | Final Temperature (° C.) | Height (mm) | Width (mm) | Remarks |
|---|---|---|---|---|---|---|---|---|---|
| 0 | 0 | 8 | 4 | 59.2 | 120 | 194.8 | 59.2 | 61.81 | Very brittle, light, crumbly |
| 2 | 0 | 8 | 2 | 67.6 | 150 | 201 | 65.8 | 64.36 | Light brown, crumbly |
| 0 | 3 | 8 | 1 | 47.9 | 150 | 203 | 58.82 | 64.5 | Yellow, firm, brittle |

TABLE 14

Texture Analysis Responses of Glycerol Citrate and Silicone Mixtures. Ingredients Include: Glycerol (G), Citric Acid (CA) and Silicone (S).

| G (g) | CA (g) | S (g) | Weight % Remaining | Time (s) | Temperature Final (° C.) | Height (mm) | Diameter (mm) | Firmness (Kg) | Springiness (%) |
|---|---|---|---|---|---|---|---|---|---|
| 4 | 8 | 0 | 64.0 | 90 | 199.7 | 64.06 | 62.31 | 12.62 | 54.07 |
| 4 | 8 | 0.3 | 72.1 | 102 | 201 | 67.48 | 67.44 | 13.46 | 49.7 |
| 4 | 8 | 0.5 | 70.4 | 116 | 200 | 68.6 | 66.22 | 14.5 | 48.86 |
| 4 | 8 | 1 | 70.1 | 120 | 198.4 | 59.47 | 56.59 | 13.53 | 41.54 |
| 4 | 8 | 1.3 | 73.7 | 140 | 199.4 | 55.15 | 62.82 | 16.66 | 40.48 |
| 4 | 8 | 1.5 | 75.6 | 140 | 201 | 45.07 | 61.21 | 16.88 | 44.09 |
| 4 | 8 | 2 | 78.9 | 140 | 201 | 43.56 | 67.41 | 15.66 | 51.87 |
| 4 | 8 | 3 | 74.8 | 140 | 200 | 48.83 | 61.11 | 10.78 | 47.04 |
| 4 | 8 | 4 | 74.0 | 150 | 200 | 48.05 | 67.71 | 8.85 | 32.95 |

We claim:

1. A method for making polyesters comprising mixing and reacting a tricarboxylic acid with glycerol or an ester thereof, with application of heating by microwave energy effective to produce a glycerol:carboxylic acid polyester while removing water by-product generated during the reaction as steam, and wherein said glycerol:carboxylic acid polyester formed by the reaction comprises a solid phase foam.

2. The method of claim 1 wherein said reacting is in the absence of an added catalyst.

3. The method of claim 1 wherein said reacting is in the absence of an added solvent.

4. The method of claim 1 wherein said di- or tricarboxylic acid is selected from the group consisting of citric acid, oxalic acid, glutaric acid, malonic acid, adipic acid, succinic acid, pimelic acid, suberic acid, azelaic acid, sebacic acid, phthalic acid, isophthalic acid, terephthalic acid, and combinations thereof.

5. The method of claim 4 wherein said di- or tricarboxylic acid comprises citric acid.

6. The method of claim 1 wherein said reacting comprises said glycerol.

7. The method of claim 1 wherein said reacting comprises said ester of glycerol, and said ester comprises epoxidized oil.

8. The method of claim 1 wherein the molar ratio of said di- or tricarboxylic acid to said glycerol or an ester thereof is greater than about 0.45:1.

9. The method of claim 8 wherein said molar ratio is between about 0.45:1 and about 2:1.

10. The method of claim 1 wherein said reacting further comprises one or more free fatty acids or esters thereof.

11. A product produced by the process of claim 1.

12. A product produced by the process of claim 6.

13. A method for making polyesters comprising mixing and reacting a di- or tricarboxylic acid with a glycerol ester comprising epoxidized oil, with application of heating by microwave energy effective to produce a glycerol:carboxylic acid polyester while removing water by-product generated during the reaction as steam.

14. A composition comprising a solid-phase foam comprising a glycerol:carboxylic acid polyester.

15. The composition of claim 14 wherein said carboxylic acid is selected from the group consisting of citric acid, oxalic acid, glutaric acid, malonic acid, adipic acid, succinic acid, pimelic acid, suberic acid, azelaic acid, sebacic acid, phthalic acid, isophthalic acid, terephthalic acid, and combinations thereof.

16. The composition of claim 14 wherein said carboxylic acid comprises citric acid and said polyester comprises a glycerol:citric acid polyester.

17. A product produced by the process of claim 13.

18. The method of claim 13 wherein said glycerol:carboxylic acid polyester formed by the reaction comprises a solid phase foam.

19. The method of claim 13 wherein said di- or tricarboxylic acid is selected from the group consisting of citric acid, oxalic acid, glutaric acid, malonic acid, adipic acid, succinic acid, pimelic acid, suberic acid, azelaic acid, sebacic acid, phthalic acid, isophthalic acid, terephthalic acid, and combinations thereof.

20. The method of claim 19 wherein said di- or tricarboxylic acid comprises citric acid.

21. The method of claim 13 wherein the molar ratio of said di- or tricarboxylic acid to said glycerol or an ester thereof is greater than about 0.45:1.

22. The method of claim 21 wherein said molar ratio is between about 0.45:1 and about 2:1.

23. The method of claim 13 wherein said reacting further comprises one or more free fatty acids or esters thereof.

* * * * *